（12）United States Patent
Yun

(10) Patent No.: US 9,931,983 B2
(45) Date of Patent: Apr. 3, 2018

(54) STEREO CAMERA AND VEHICLE COMPRISING SAME

(71) Applicant: LG ELECTRONICS INC., Seoul (KR)

(72) Inventor: Donghwa Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/105,014

(22) PCT Filed: Dec. 16, 2014

(86) PCT No.: PCT/KR2014/012418
§ 371 (c)(1),
(2) Date: Jun. 16, 2016

(87) PCT Pub. No.: WO2015/093828
PCT Pub. Date: Jun. 25, 2015

(65) Prior Publication Data
US 2016/0375828 A1 Dec. 29, 2016

(30) Foreign Application Priority Data
Dec. 16, 2013 (KR) .................. 10-2013-0156488

(51) Int. Cl.
*B60S 1/54* (2006.01)
*B60R 11/04* (2006.01)
(Continued)

(52) U.S. Cl.
CPC .............. *B60R 1/00* (2013.01); *B60R 11/04* (2013.01); *B60S 1/023* (2013.01); *B60S 1/0848* (2013.01);
(Continued)

(58) Field of Classification Search
CPC . B60S 1/54; G03B 15/00; B60R 11/04; B60R 21/013; B60R 1/00; H04N 5/2252;
(Continued)

(56) References Cited

U.S. PATENT DOCUMENTS 4,978,214 A * 12/1990 Kawata ............... G02B 27/0101
353/114
7,813,639 B2 * 10/2010 Yoneji ..................... B60R 11/04
359/611
(Continued)

FOREIGN PATENT DOCUMENTS

EP    1 389 565 B1    12/2006
JP    2002-341432 A1  11/2002
(Continued)

OTHER PUBLICATIONS

Internationl Search Report dated Apr. 1, 2015 for Application No. PCT/KR2014/012418, 4 Pages.
(Continued)

*Primary Examiner* — Yuri Kan
(74) *Attorney, Agent, or Firm* — Fish & Richardson P.C.

(57) ABSTRACT

A stereo camera includes a first lens and a second lens, a first light shield unit and a second light shield unit respectively provided at front sides of the first and second lenses to shield light incident on the first and second lenses, a first fan and a second fan respectively provided at the sides of the first and second lenses to defrost a windshield of a vehicle, and a front case in which the first and second light shield units are provided at both sides of a main body. The first and second light shield units are attachable to or detachable from the front case, a width of the first light shield unit is less than a length thereof and is greater than a height thereof, and a distance between the first and second lenses is greater than the width of the first light shield unit.

14 Claims, 22 Drawing Sheets

(51) Int. Cl.
  *G01C 3/18* (2006.01)
  *B60R 1/00* (2006.01)
  *B60S 1/02* (2006.01)
  *B60S 1/08* (2006.01)
  *B60W 10/18* (2012.01)
  *B60W 10/20* (2006.01)
  *B60W 10/22* (2006.01)
  *B60W 30/02* (2012.01)
  *G03B 5/04* (2006.01)
  *G03B 11/04* (2006.01)
  *G03B 17/56* (2006.01)
  *G06K 9/00* (2006.01)
  *H04N 5/225* (2006.01)
  *H04N 13/02* (2006.01)
  *G03B 17/55* (2006.01)
  *G03B 35/08* (2006.01)
  *G03B 17/02* (2006.01)
  *H04N 13/00* (2018.01)
  *B60R 11/00* (2006.01)
  *B60S 1/56* (2006.01)

(52) U.S. Cl.
  CPC .............. *B60S 1/54* (2013.01); *B60W 10/18* (2013.01); *B60W 10/20* (2013.01); *B60W 10/22* (2013.01); *B60W 30/02* (2013.01); *G03B 5/04* (2013.01); *G03B 11/045* (2013.01); *G03B 17/55* (2013.01); *G03B 17/561* (2013.01); *G03B 35/08* (2013.01); *G06K 9/00805* (2013.01); *H04N 5/2252* (2013.01); *H04N 5/2257* (2013.01); *H04N 13/0239* (2013.01); *B60R 2011/0026* (2013.01); *B60R 2300/105* (2013.01); *B60R 2300/107* (2013.01); *B60R 2300/205* (2013.01); *B60S 1/56* (2013.01); *B60W 2420/42* (2013.01); *B60W 2510/18* (2013.01); *B60W 2510/20* (2013.01); *B60W 2510/22* (2013.01); *G03B 17/02* (2013.01); *H04N 2013/0081* (2013.01)

(58) Field of Classification Search
  CPC ...... H04N 7/183; G06K 9/00624; G01C 3/18; G02B 27/0101
  See application file for complete search history.

(56) References Cited

U.S. PATENT DOCUMENTS

| | | | | |
|---|---|---|---|---|
| 2003/0095182 A1* | 5/2003 | Imoto | ................. | H04N 7/183 348/148 |
| 2005/0168575 A1* | 8/2005 | Mattes | ................. | B60R 21/013 348/148 |
| 2009/0135246 A1* | 5/2009 | Uchiyama | ................. | G01C 3/18 348/42 |
| 2010/0201817 A1* | 8/2010 | Katoh | ................. | B60R 1/00 348/148 |
| 2013/0107110 A1* | 5/2013 | Park | ................. | H04N 5/2252 348/373 |
| 2013/0259309 A1* | 10/2013 | Sekiguchi | ................. | G06K 9/00624 382/103 |
| 2013/0300872 A1* | 11/2013 | Park | ................. | B60R 1/00 348/148 |
| 2014/0247390 A1* | 9/2014 | Ohsumi | ................. | B60R 11/04 348/373 |
| 2015/0042804 A1* | 2/2015 | Okuda | ................. | B60R 11/04 348/148 |
| 2015/0097013 A1* | 4/2015 | Rawlings | ................. | B60R 11/04 224/567 |

FOREIGN PATENT DOCUMENTS

| | | | | |
|---|---|---|---|---|
| JP | 2002341432 A | * | 11/2002 | ............ G03B 15/00 |
| JP | 2013-054399 A1 | | 3/2013 | |
| JP | 2013203250 | | 10/2013 | |
| KR | 10-2012-0027855 A1 | | 3/2012 | |
| WO | WO 2013/146093 A1 | | 10/2013 | |

OTHER PUBLICATIONS

Korean Notice of Allowance in Korean Application No. 10-2013-0156488, dated Dec. 27, 2016, 2 pages.

* cited by examiner (a)

(b)

STEREO CAMERA AND VEHICLE COMPRISING SAME

CROSS REFERENCE TO RELATED APPLICATIONS

This application is a U.S. National Phase Application under 35 U.S.C. § 371 of International Application PCT/KR2014/012418, filed on Dec. 16, 2014, which claims the benefit of Korean Application No. 10-2013-0156488, filed on Dec. 16, 2013, the entire contents of which are hereby incorporated by reference in their entireties.

TECHNICAL FIELD

The present invention relates to a stereo camera and a vehicle including the same, and more particularly, to a stereo camera capable of defrosting a windshield of a vehicle, and a vehicle including the same.

BACKGROUND

A vehicle is an apparatus that allows a user who rides therein to drive the apparatus in a desired direction. A representative example of the vehicle may be an automobile.

Meanwhile, for convenience of the user who uses the vehicle, the vehicle is provided with, for example, various sensors and electronic devices. In particular, for example, various devices for user driving convenience are being developed.

In particular, up to now, vehicle safety control for preventing accidents while driving a vehicle has been conducted by a driver. However, human recognition ability is restrictive in vehicle safety control under various driving conditions. In particular, when a driver recognizes a front obstacle slightly late while driving on an expressway, a major accident may be caused. Even when a vehicle travels at a low speed, it is difficult to avoid an obstacle which suddenly appears. Efforts for coping with such problems and manufacturing a safer vehicle have been made and a representative method thereof includes an obstacle detection method using an image.

As the obstacle detection method using the image, 2D camera technology of sensing the shape of an object using only one image and performing vehicle safety control cannot easily and accurately acquire information on a distance from the object. Therefore, it is difficult to use this technology in vehicle safety control while a vehicle travels at a high speed.

SUMMARY

An object of the present invention devised to solve the problem lies in a stereo camera capable of defrosting a windshield of a vehicle, and a vehicle including the same.

In accordance with one embodiment of the present invention, the above and other objects can be accomplished by providing a stereo camera including a first lens and a second lens, a first light shield unit and a second light shield unit respectively provided at front sides of the first lens and the second lens in order to shield light incident on the first lens and the second lens, a first fan and a second fan respectively provided at the sides of the first lens and the second lens to operate in order to defrost a windshield of a vehicle, and a front case in which the first light shield unit and the second light shield unit are provided at both sides of a main body, wherein the first light shield unit and the second light shield unit are able to be attached to or detached from the front case, wherein a width of the first light shield unit is less than a length of the first light shield unit and the width of the first light shield unit is greater than a height of the first light shield unit, and wherein a distance between the first lens and the second lens is greater than the width of the first light shield unit.

In accordance with another embodiment of the present invention, the above and other objects can be accomplished by providing a stereo camera including a first lens and a second lens, a first light shield unit and a second light shield unit respectively provided at front sides of the first lens and the second lens in order to shield light incident on the first lens and the second lens, and a first hot wire and a second hot wire respectively provided in the first light shield unit and the second light shield unit.

In accordance with another embodiment of the present invention, the above and other objects can be accomplished by providing stereo camera including a front case in which a first light shield unit and a second light shield unit are provided at both sides of a main body, a stereo camera module including a first lens and a second lens and a side protrusion for coupling with the front case, and a rear case coupled to the front case and the stereo camera module and including a plurality of protrusions for coupling with the front case.

In accordance with one embodiment of the present invention, the above and other objects can be accomplished by providing a vehicle including a sensor unit to sense a vehicle state, a steering drive unit to drive a steering apparatus, a brake drive unit to drive a brake apparatus, a power source drive unit to drive a power source, a suspension drive unit to drive a suspension apparatus, a controller to control the steering drive unit, the brake drive unit, the power source drive unit and the suspension drive unit, and a vehicle driving assistance device including a stereo camera including a first lens and a second lens, a first light shield unit and a second light shield unit respectively provided at front sides of the first lens and the second lens in order to shield light incident on the first lens and the second lens, and a first fan and a second fan respectively provided at the sides of the first lens and the second lens to operate in order to defrost a windshield of the vehicle.

DETAILED DESCRIPTION

Hereinafter, the embodiments disclosed in the present specification will be described in detail with reference to the accompanying drawings.

With respect to constituent elements used in the following description, suffixes "module" and "unit" are given or mingled with each other only in consideration of ease in preparation of the specification, and do not have or serve as different meanings.

A vehicle as described in this specification may include an automobile and a motorcycle. Hereinafter, an automobile will be focused upon.

A vehicle as described in this specification may include all of a vehicle including an engine, a hybrid vehicle including both an engine and an electric motor, and an electric vehicle including an electric motor. Hereinafter, a vehicle including an engine will be focused upon.

A vehicle driving assistance device as described in this specification may be referred to as an advanced driver assistance system (ADAS) or an advanced driver assistance apparatus (ADAA). Hereinafter, a vehicle driving assistance device and a vehicle having the same according to various embodiments of the present invention will be described.

Figure 1:
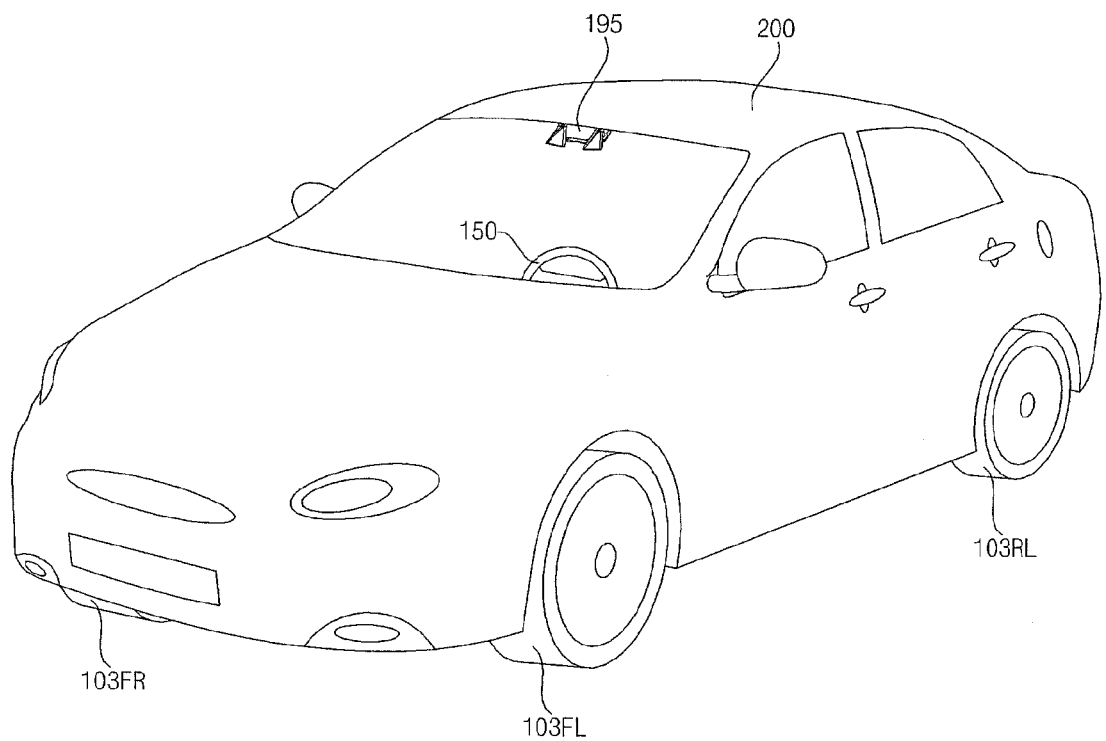
FIG. 1 is a diagram showing the appearance of a vehicle including a stereo camera according to one embodiment of the present invention.

FIG. 1 is a diagram showing the appearance of a vehicle including a stereo camera according to one embodiment of the present invention.

Referring to the figure, a vehicle 200 may include wheels 103FR, 103FL, 103RL, . . . rotated by a power source, a steering wheel 150 for controlling the direction of travel of the vehicle 200, and a stereo camera 195 provided inside the vehicle 200.

Figure 3A:
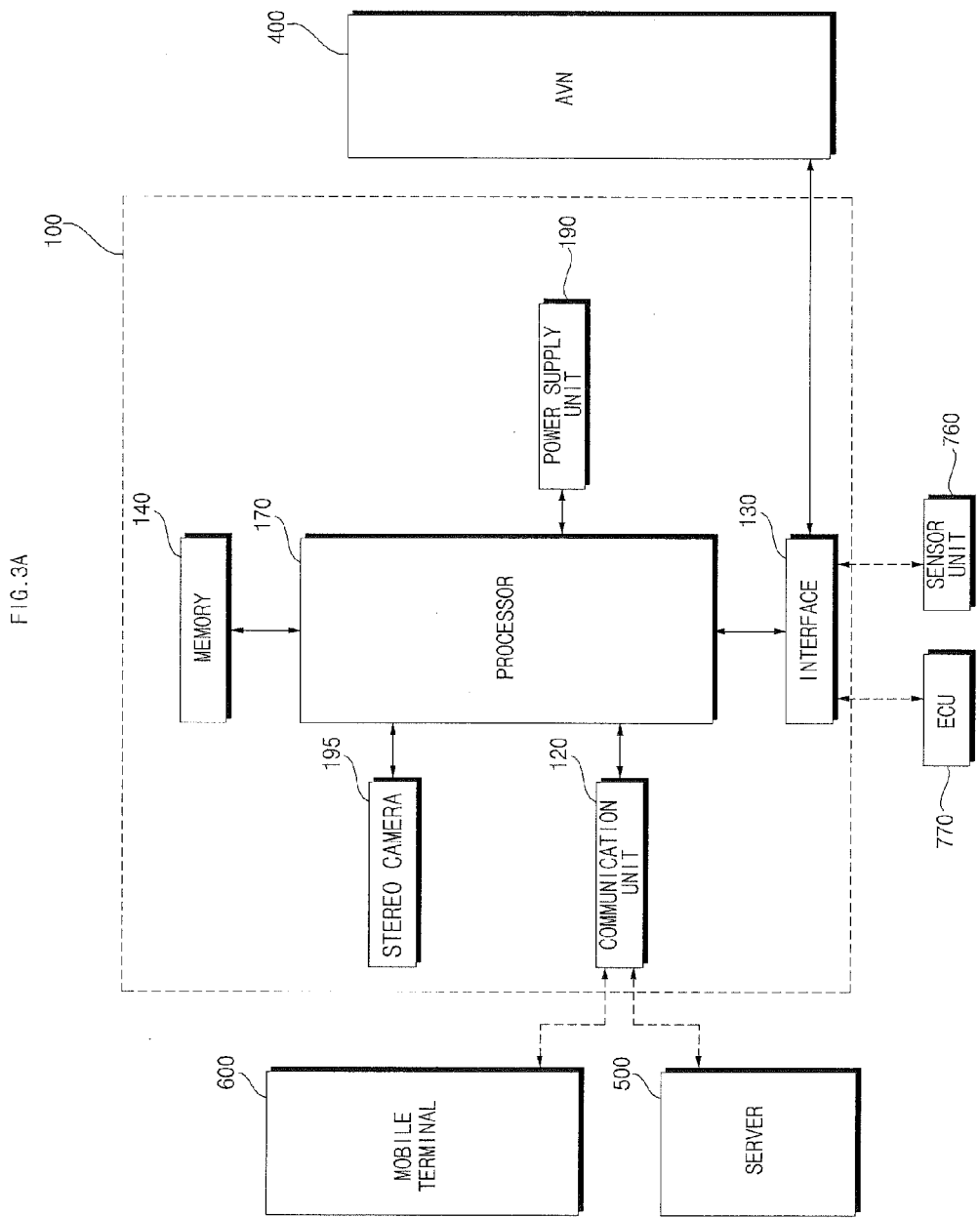
FIGS. 3A to 3B are block diagrams showing various examples of the internal configuration of a vehicle driving assistance device according to one embodiment of the present invention.

The stereo camera 195 may include a plurality of cameras and stereo images acquired by the plurality of cameras may be processed in the vehicle driving assistance device (100 of FIG. 3A).

In the figure, the stereo camera 195 includes two cameras.

Figure 2:
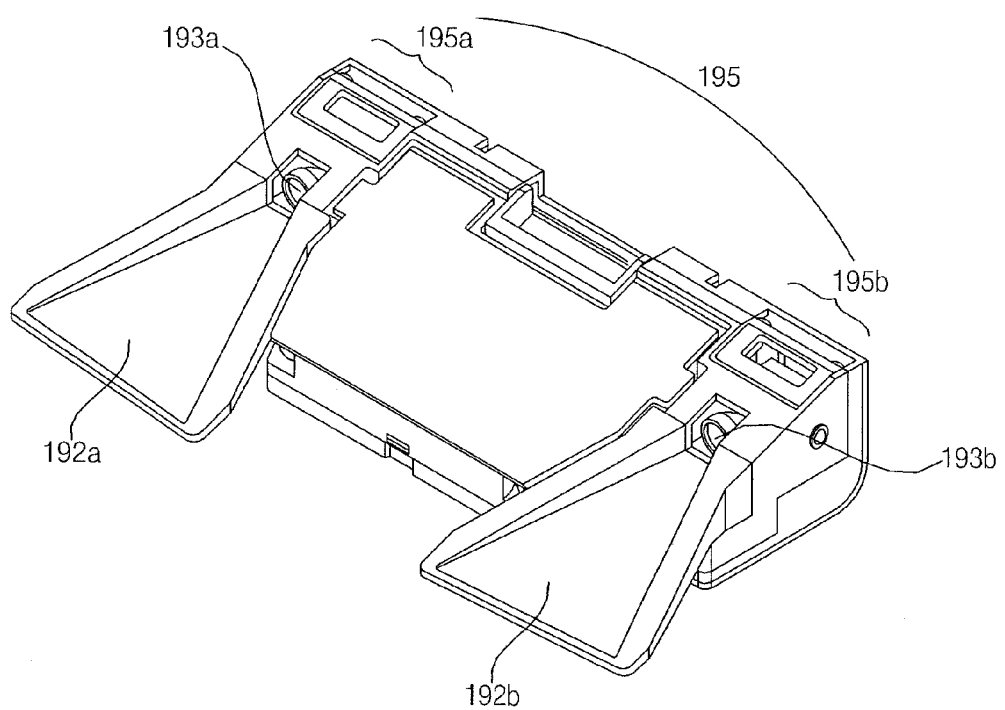
FIG. 2 is a diagram showing the appearance of the stereo camera attached to the vehicle of FIG. 1.

FIG. 2 is a diagram showing the appearance of the stereo camera attached to the vehicle of FIG. 1.

Referring to the figure, the stereo camera module 195 may include a first camera 195a including a first lens 193a and a second camera 195b including a second lens 193b.

The stereo camera module 195 may include first and second light shield units 192a and 192b for shielding light incident on the first and second lenses 193a and 193b.

The stereo camera module 195 of the figure may be attached to and detached from a ceiling or windshield of the vehicle 200.

The vehicle driving assistance device (100 of FIG. 3A) including such a stereo camera module 195 may acquire stereo images of the front side of the vehicle from the stereo camera module 195, perform disparity detection based on the stereo images, perform object detection with respect to at least one stereo image, and continuously track motion of an object after object detection.

Figure 3B:
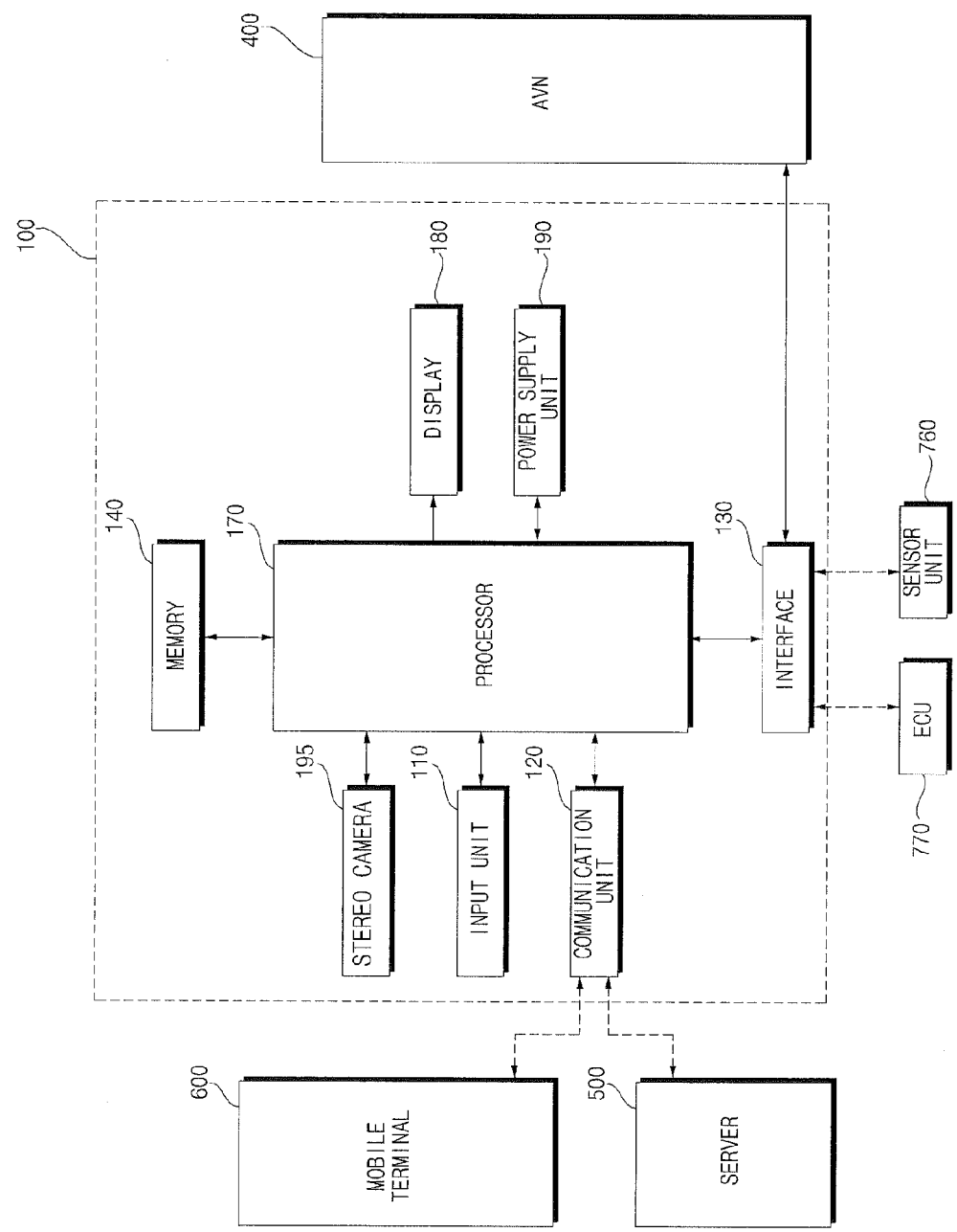

FIGS. 3A to 3B are block diagrams showing various examples of the internal configuration of a vehicle driving assistance device according to one embodiment of the present invention.

The vehicle driving assistance device 100 of FIGS. 3A to 3B may process stereo images received from the stereo camera 195 based on computer vision and generate vehicle related information. Here, the vehicle related information may include vehicle control information for direct control of the vehicle or vehicle driving assistance information for providing a driving guide to a driver.

First, referring to FIG. 3A, the vehicle driving assistance device 100 of FIG. 3A may include a communication unit 120, an interface 130, a memory 140, a processor 170, a power supply unit 190 and a stereo camera 195. In addition, an audio input unit (not shown) and an audio output unit (not shown) may be further included.

The communication unit 120 may exchange data with a mobile terminal 600 or a server 500 in a wireless manner. In particular, the communication unit 120 may exchange data with the mobile terminal of the driver in a wireless manner. The wireless communication method may include various data communication methods such as Bluetooth, Wi-Fi Direct, Wi-Fi or APiX.

The communication unit 120 may receive weather information and road traffic state information, e.g., Transport Protocol Experts Group (TPEG) information, from the mobile terminal 600 or the server 500. In the vehicle driving assistance device 100, real-time traffic information obtained based on the stereo images may be transmitted to the mobile terminal 600 or the server 500.

When a user gets into the vehicle 100, the mobile terminal 600 of the user and the vehicle driving assistance device 100 may pair with each other automatically or as the user executes an application.

The interface 130 may receive vehicle related data or transmit signals processed or generated in the processor 170 to an external device. The interface 130 may perform data communication with an ECU 770, an audio video navigation (AVN) apparatus 400 and a sensor unit 760 using a wired or wireless communication method.

The interface 130 may receive map information related to vehicle traveling through data communication with the AVN apparatus 400.

The interface 130 may receive sensor information from the ECU 770 or the sensor unit 760.

The sensor information may include at least one of vehicle direction information, vehicle position information (GPS information), vehicle angle information, vehicle speed information, vehicle acceleration information, vehicle tilt information, vehicle forward/reverse information, battery information, fuel information, tier information, vehicle lamp information, vehicle interior temperature information, vehicle interior humidity information, etc.

Such sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tier sensor, a steering sensor based on rotation of the steering wheel, a vehicle interior temperature sensor, a vehicle interior humidity sensor, etc. The position module may include a GPS module for receiving GPS information.

Information related to vehicle traveling, such as vehicle direction information, vehicle position information, vehicle angle information, vehicle speed information and vehicle tilt information, may be referred to as vehicle traveling information.

The memory 140 may store a variety of data for overall operation of the vehicle driving assistance device 100, such as a program for processing or control of the processor 170.

An audio output unit (not shown) converts an electrical signal from the processor 170 into an audio signal and outputs the audio signal. The audio output unit may include a speaker. The audio output unit (not shown) may output sound corresponding to operation of the input unit 110, that is, a button.

An audio input unit (not shown) may receive user voice and may include a microphone. The received voice may be converted into an electrical signal and the electrical signal may be delivered to the processor 170.

The processor 170 controls overall operation of the units of the vehicle driving assistance device 100.

In particular, the processor 170 performs signal processing based on computer vision. The processor 170 acquires the stereo images of the front side of the vehicle from the stereo camera 195, performs disparity calculation with respect to the front side of the vehicle based on the stereo images, performs object detection with respect to at least one of the stereo images based on the calculated disparity information, and continuously tracks motion of an object after object detection.

In particular, the processor 170 may perform lane detection, peripheral vehicle detection, pedestrian detection, traffic sign detection, road surface detection, etc. upon object detection.

The processor 170 may calculate a distance from a detected peripheral vehicle, the speed of the detected peripheral vehicle, a speed difference with the detected peripheral vehicle, etc.

The processor 170 may receive weather information and road traffic state information, e.g., Transport Protocol Experts Group (TPEG) information, through the communication unit 120.

The processor 170 may confirm the traffic condition information in real time based on the stereo images in the vehicle driving assistance device 100.

The processor 170 may receive map information from the AVN apparatus 400 through the interface 130.

The processor 170 may receive sensor information from the ECU 770 or the sensor unit 760 through the interface 130. The sensor information may include at least one of vehicle direction information, vehicle position information (GPS information), vehicle angle information, vehicle speed information, vehicle acceleration information, vehicle tilt information, vehicle forward/reverse information, battery information, fuel information, tier information, vehicle lamp information, vehicle interior temperature information, vehicle interior humidity information, etc.

The power supply unit 190 may supply power required to operate the respective components under the control of the controller 170. In particular, the power supply unit 190 may receive power from, for example, a battery (not illustrated) inside the vehicle 100.

The stereo camera 195 may include a plurality of cameras. Hereinafter, as described with reference to FIG. 2, the stereo camera 195 includes two cameras.

The stereo camera 195 may be attached to or detached from the ceiling or windshield of the vehicle 200 and may include a first camera 195a including a first lens 193a and a second camera including a second lens 193b.

The stereo camera 195 may include first and second light shield units 192a and 192b for shielding light incident on the first and second lenses 193a and 193b.

Next, referring to FIG. 3B, the vehicle driving assistance device 100 of FIG. 3B may further include an input unit 110 and a display 180, as compared to the vehicle driving assistance device 100. Hereinafter, only the input unit 110 and the display 180 will be described.

The input unit 110 may include a plurality of buttons or a touchscreen attached to the vehicle driving assistance device 100 and, more particularly, the stereo camera 195. Through the plurality of buttons or the touchscreen, the vehicle driving assistance device 100 may be powered on. In addition, a variety of input operations may be performed.

The display 180 may display an image related to operation of the vehicle driving assistance device. For image display, the display 180 may include a cluster or a head up display (HUD) located at the internal front side of the vehicle. When the display 180 is a HUD, a projection module for projecting an image on the windshield of the vehicle 200 may be included.

Figure 4A:
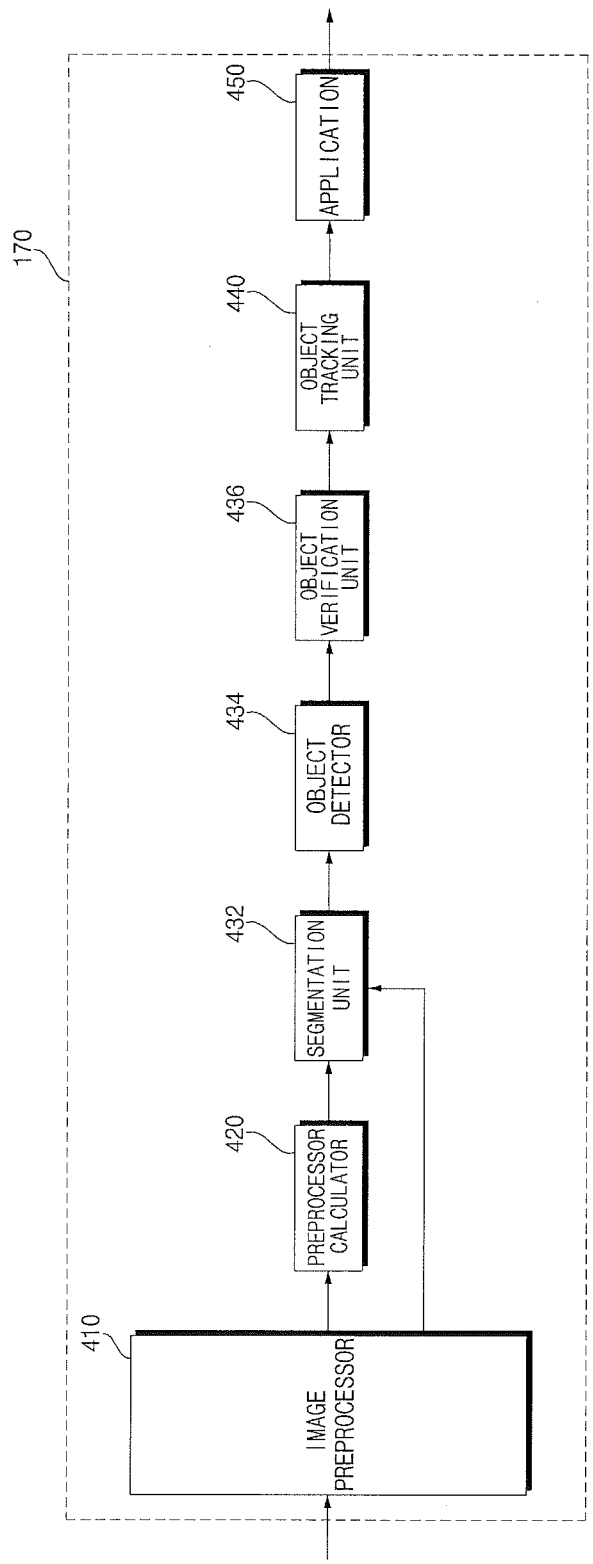
FIGS. 4A to 4B are block diagrams showing various examples of the internal configuration of the processors of FIGS. 3A to 3B.
Figure 4B:
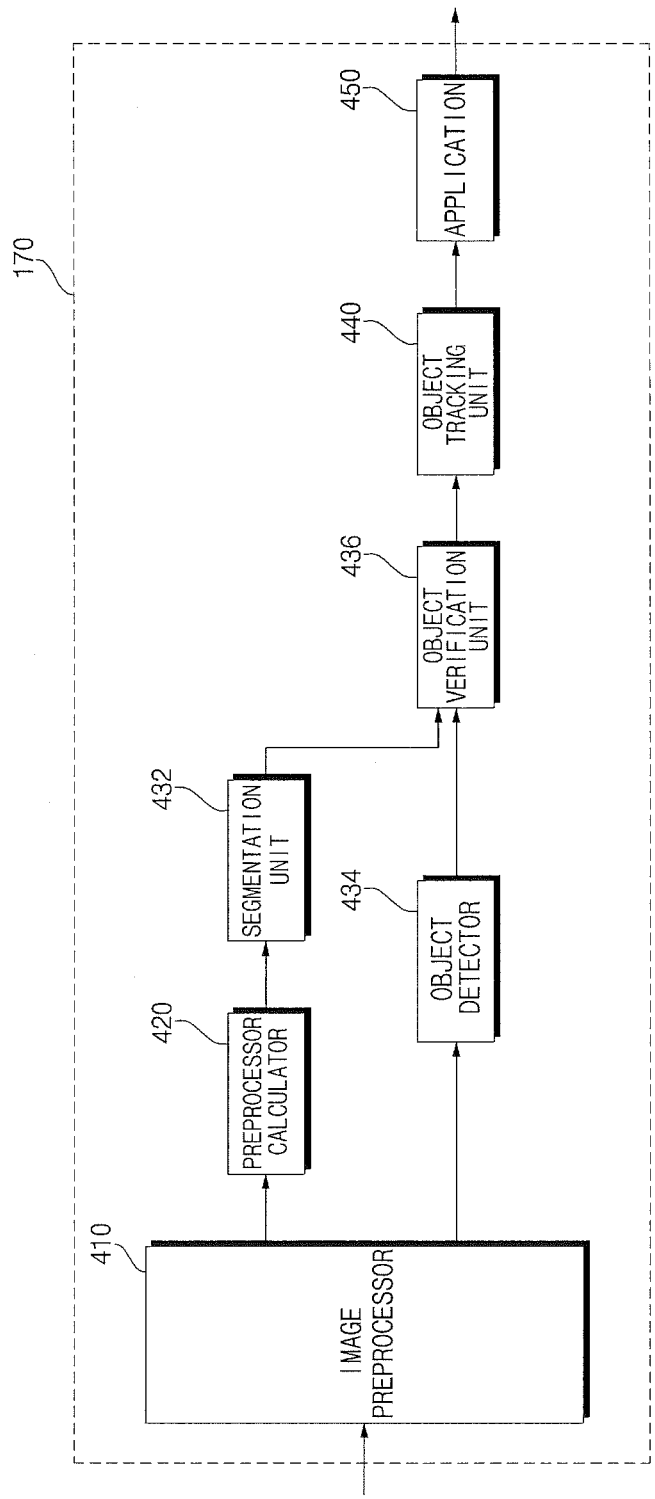

FIGS. 4A to 4B are block diagrams showing various examples of the internal configuration of the processors of FIGS. 3A to 3B, and FIGS. 5A to 5B are diagrams referenced to explain operation of the processors of FIGS. 4A to 4B.

First, referring to FIG. 4A, FIG. 4A is a block diagram showing an example of the internal configuration of the processor 170. The processor 170 of the vehicle driving assistance device 100 may include an image pre-processor 410, a disparity calculator 420, an object detector 434, an object tracking unit 440 and an application 450.

The image preprocessor 410 receives the stereo images from the stereo camera 195 and performs preprocessing.

More specifically, the image preprocessor 410 may perform noise reduction, rectification, calibration, color enhancement, color space conversion (CSC), interpolation, camera gain control, etc. with respect to the stereo image. Therefore, it is possible to acquire stereo images having higher definition than that of the stereo images captured by the stereo camera 195.

The disparity calculator 420 receives the stereo images processed by the image preprocessor 410, performs stereo matching with respect to the received stereo images, and acquires a disparity map according to stereo matching. That is, it is possible to acquire disparity information of the stereo images of the front side of the vehicle.

At this time, stereo matching may be performed in pixel units of the stereo images or predetermined block units. The disparity map may mean a map numerically expressing the binocular parallax information of the stereo images, that is, left and right images.

A segmentation unit 432 may perform segmentation and clustering with respect to at least one of the stereo images based on the disparity information from the disparity calculator 420.

More specifically, the segmentation unit 432 may segment a background and a foreground with respect to at least one of the stereo images based on the disparity information.

For example, a region having disparity information of a predetermined value or less in the disparity map may be calculated as the background and be excluded. Therefore, the foreground may be segmented.

As another example, a region having disparity information of a predetermined value or more in the disparity map may be calculated as the foreground and be extracted. Therefore, the background may be segmented.

The foreground and the background may be segmented based on the disparity information extracted based on the stereo images, thereby reducing a signal processing speed, the amount of processed signals, etc. upon subsequent object detection.

Next, the object detector 434 may detect an object based on image segmentation of the segmentation unit 432.

That is, the object detector 434 may detect an object from at least one of the stereo images based on the disparity information.

More specifically, the object detector 434 may detect the object from at least one of the stereo images. For example, the object may be detected from the foreground segmented by segmentation.

Next, an object verification unit 436 classifies and verifies the segmented objects.

To this end, the object verification unit 436 may use an identification method using a neural network, a support vector machine (SVM) method, an AdaBoost identification method using Haar-like features or a histograms-of-oriented-gradients (HOG) method, etc.

The object verification unit 436 may compare the detected object with the objects stored in the memory 140 to verify the object.

For example, the object verification unit 436 may verify a peripheral vehicle, a lane, a road surface, a traffic sign, a dangerous zone, a tunnel, etc. located in the vicinity of the vehicle.

The object tracking unit 440 tracks the verified object. For example, objects in the sequentially acquired stereo images may be verified, motion or motion vectors of the verified objects may be calculated and movement of the objects may be tracked based on the calculated motion or motion vectors. Therefore, it is possible to track the peripheral vehicle, the lane, the road surface, the traffic sign, the dangerous zone, the tunnel, etc. located in the vicinity of the vehicle.

Next, the application 450 may calculate a degree of danger of the vehicle 200 based on the various objects located in the vicinity of the vehicle, e.g., another vehicle, a lane, a road surface, a traffic sign, etc. In addition, collision with a preceding vehicle or vehicle slipping may be calculated.

The application 450 may output a message indicating such information to a user as vehicle driving assistance information based on the calculated degree of danger, collision with another vehicle or vehicle slipping. Alternatively, a control signal for attitude control or driving control of the vehicle 200 may be generated as vehicle control information.

FIG. 4B is a block diagram showing another example of the internal configuration of the processor.

Referring to the figure, the processor 170 of FIG. 4B is equal to the processor 170 of FIG. 4A except for a signal processing order. Hereinafter, only the difference will be described.

The object detector 434 may receive the stereo images and detect the object from at least one of the stereo images. Unlike FIG. 4A, the object may not be detected from the segmented image but may be directly detected from the stereo images based on the disparity information.

Next, the object verification unit 436 classifies and verifies the image segment from the segmentation unit 432 and the object detected by the object detector 434.

To this end, the object verification unit 436 may use an identification method using a neural network, a support vector machine (SVM) method, an AdaBoost identification method using Haar-like features or a histograms-of-oriented-gradients (HOG) method, etc.

Figure 5A:
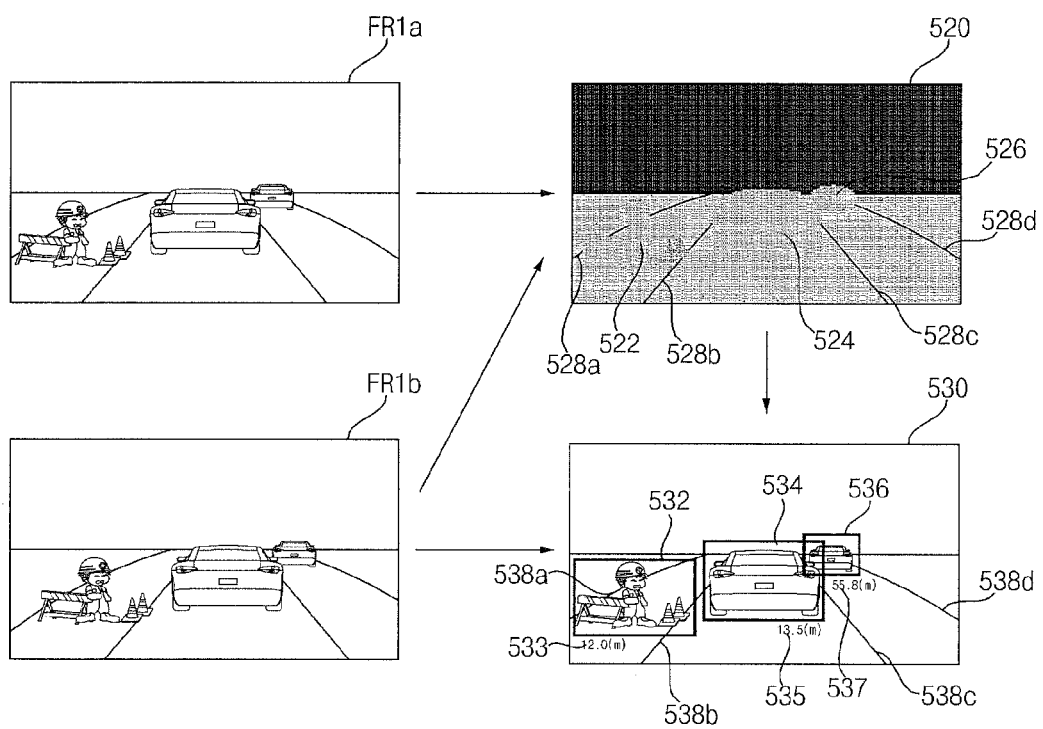
FIGS. 5A to 5B are diagrams referenced to explain operation of the processors of FIGS. 4A to 4B.
Figure 5B:
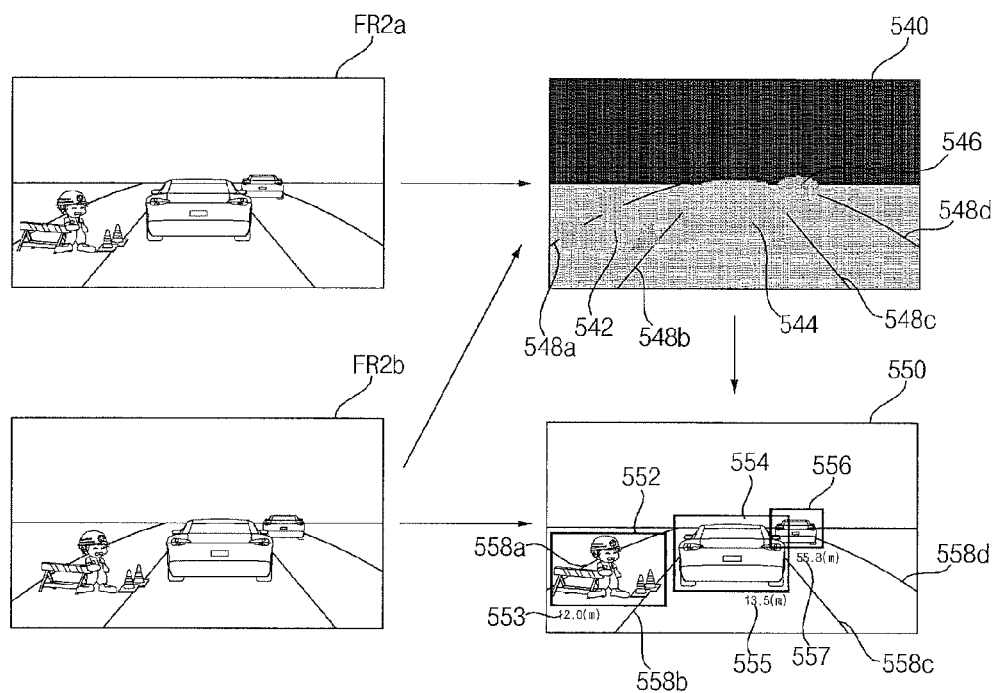

FIGS. 5A and 5B are views referenced to explain operation of the processor 170 of FIG. 4A based on the stereo images acquired during first and second frame periods.

First, referring to FIG. 5A, the stereo camera 195 acquires the stereo images during the first frame period.

The disparity calculator 420 of the processor 170 receives the stereo images FR1a and FR1b processed by the image preprocessor 410, performs stereo matching with respect to the received stereo images FR1a and FR1b, and acquires a disparity map 520.

The disparity map 520 expresses the binocular parallax level between the stereo images FR1a and FR1b. As a disparity level increases, a distance from a vehicle decreases and, as the disparity level decreases, the distance from the vehicle increases.

When such a disparity map is displayed, as the disparity level increases, luminance increases and, as the disparity level decreases, luminance decreases.

In the figure, the disparity map 520 has disparity levels respectively corresponding to first to fourth lanes 528a, 528b, 528c and 528d, for example, disparity levels respectively corresponding to a construction area 522, a first preceding vehicle 524 and a second preceding vehicle 526.

The segmentation unit 432, the object detector 434 and the object verification unit 436 may perform segmentation, object detection and object verification with respect to at least one of the stereo images FR1a and FR1b based on the disparity map 520.

In the figure, object detection and verification are performed with respect to the second stereo image FR1b using the disparity map 520.

That is, the first to fourth lanes 538a, 538b, 538c and 538d, the construction area 532, the first preceding vehicle 534 and the second preceding vehicle 536 are detected and verified from the image 530 as objects.

Next, referring to FIG. 5B, the stereo camera 195 acquires the stereo images during the second frame period.

The disparity calculator 420 of the processor 170 receives the stereo images FR2a and FR2b processed by the image preprocessor 410, performs stereo matching with respect to the received stereo images FR2a and FR2b, and acquires a disparity map 540.

In the figure, the disparity map 540 has disparity levels respectively corresponding to first to fourth lanes 548a, 548b, 548c and 548d, for example, disparity levels respectively corresponding to a construction area 542, a first preceding vehicle 544 and a second preceding vehicle 546.

The segmentation unit 432, the object detector 434 and the object verification unit 436 may perform segmentation, object detection and object verification with respect to at least one of the stereo images FR2a and FR2b based on the disparity map 520.

In the figure, object detection and verification are performed with respect to the second stereo image FR2b using the disparity map 540.

That is, the first to fourth lanes 558a, 558b, 558c and 558d, the construction area 552, the first preceding vehicle 554 and the second preceding vehicle 556 are detected and verified from the image 550 as objects.

The object tracking unit 440 may track the verified objects by comparing FIG. 5A and FIG. 5B.

More specifically, the object tracking unit 440 may track movement of the objects based on the motion or motion vectors of the objects verified as shown in FIGS. 5A and 5B. Therefore, it is possible to track the lane, the construction area, the first preceding vehicle and the second preceding vehicle located in the vicinity of the vehicle.

Figure 6A:
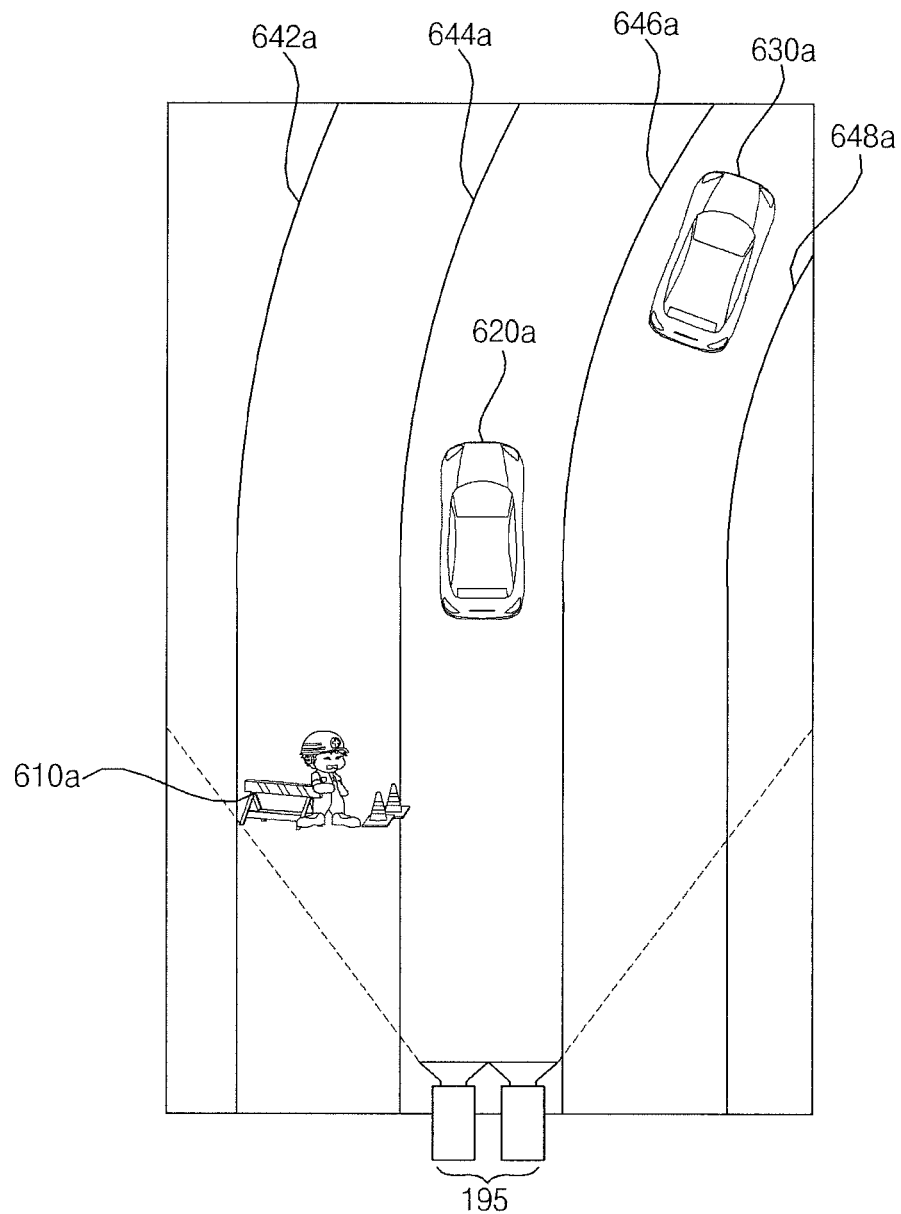
FIGS. 6A to 6B are views referenced to explain operation of the vehicle driving assistance device of FIGS. 3A to 3B.
Figure 6B:
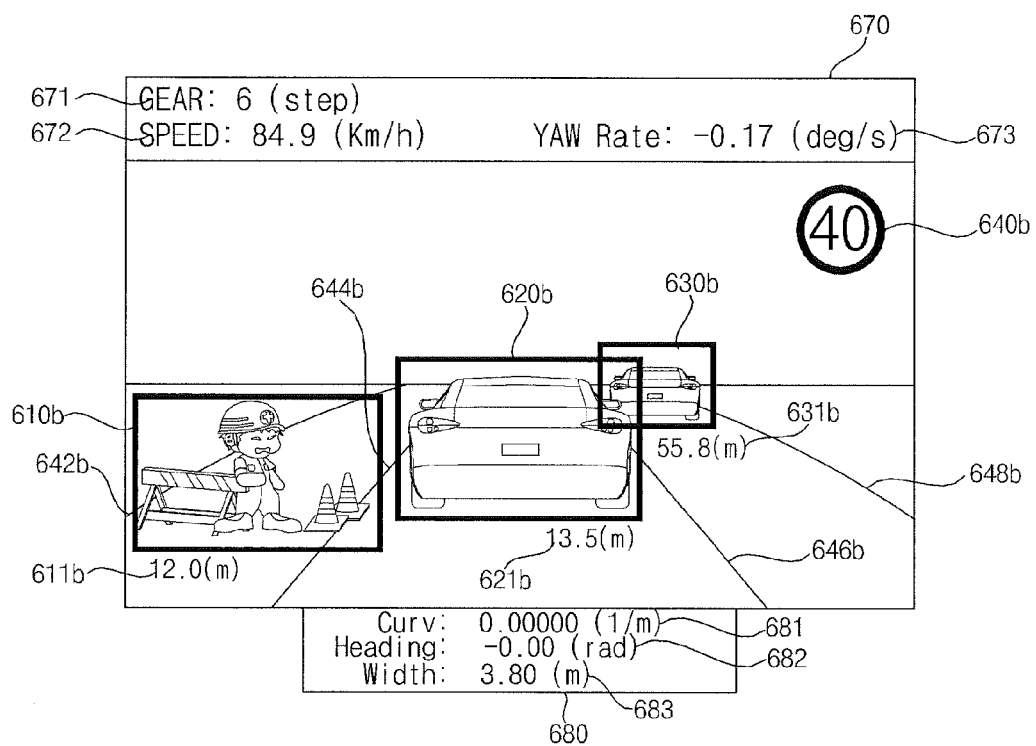

FIGS. 6A to 6B are views referenced to explain operation of the vehicle driving assistance device of FIGS. 3A to 3B.

First, FIG. 6A shows the road conditions at the front side of the vehicle captured by the stereo camera 195 provided in the vehicle. In particular, the road conditions at the front side of the vehicle are shown in a bird's eye view.

Referring to the figure, a first lane 642a, a second lane 644a, a third lane 646a and a fourth lane 648a are sequentially located from the left to the right, a construction area 610a is located between the first lane 642a and the second lane 644a, a first preceding vehicle 620a is located between the second lane 644a and the third lane 646a, and a second preceding vehicle 630a is located between the third lane 646a and the fourth lane 648a.

Next, FIG. 6B shows the condition of the front side of the vehicle grasped by the vehicle driving assistance device along with a variety of information. In particular, the image shown in FIG. 6B may be displayed on the display 180 or the AVN apparatus 400 provided in the vehicle driving assistance device.

In FIG. 6B, information is displayed based on the image captured by the stereo camera 195, unlike FIG. 6A.

Referring to the figure, a first lane 642b, a second lane 644b, a third lane 646b and a fourth lane 648b are sequentially located from the left to the right, a construction area 610b is located between the first lane 642b and the second lane 644b, a first preceding vehicle 620b is located between the second lane 644b and the third lane 646b, and a second preceding vehicle 630b is located between the third lane 646b and the fourth lane 648b.

The vehicle driving assistance device 100 may perform signal processing based on the stereo images captured by the stereo camera 195 and verify the objects of the construction area 610b, the first preceding vehicle 620b and the second preceding vehicle 630b. In addition, the first lane 642b, the second lane 644b, the third lane 646b and the fourth lane 648b may be verified.

The edges of the construction area 610b, the first preceding vehicle 620b and the second preceding vehicle 630b are highlighted in order to show object verification.

The vehicle driving assistance device 100 may calculate information on distances from the construction area 610b, the first preceding vehicle 620b and the second preceding vehicle 630b based on the stereo images captured by the stereo camera 195.

In the figure, first distance information 611b, second distance information 621b and third distance information 631b respectively corresponding to the construction area 610b, the first preceding vehicle 620b and the second preceding vehicle 630b are shown.

The vehicle driving assistance device 100 may receive the sensor information of the vehicle from the ECU 770 or the sensor unit 760. In particular, vehicle speed information, gear information, yaw rate information indicating the rate of the rotation angle (yaw angle) of the vehicle and vehicle angle information may be received and displayed.

Although the vehicle speed information 672, the gear information 671 and the yaw rate information 673 are displayed at the upper side 670 of the front image of the vehicle and the vehicle angle information 682 is displayed at the lower side 680 of the front image of the vehicle in the figure, the present invention is not limited thereto. Vehicle width information 683 and road curvature information 681 may be displayed along with the vehicle angle information 682.

The vehicle driving assistance device 100 may receive speed limit information of a road, on which the vehicle travels, through the communication unit 120 or the interface 130. In the figure, the speed limit information 640b is displayed.

The vehicle driving assistance device 100 may display a variety of information shown in FIG. 6B on the display 180 or store a variety of information without displaying the information. Such information may be used for various applications.

Figure 7:
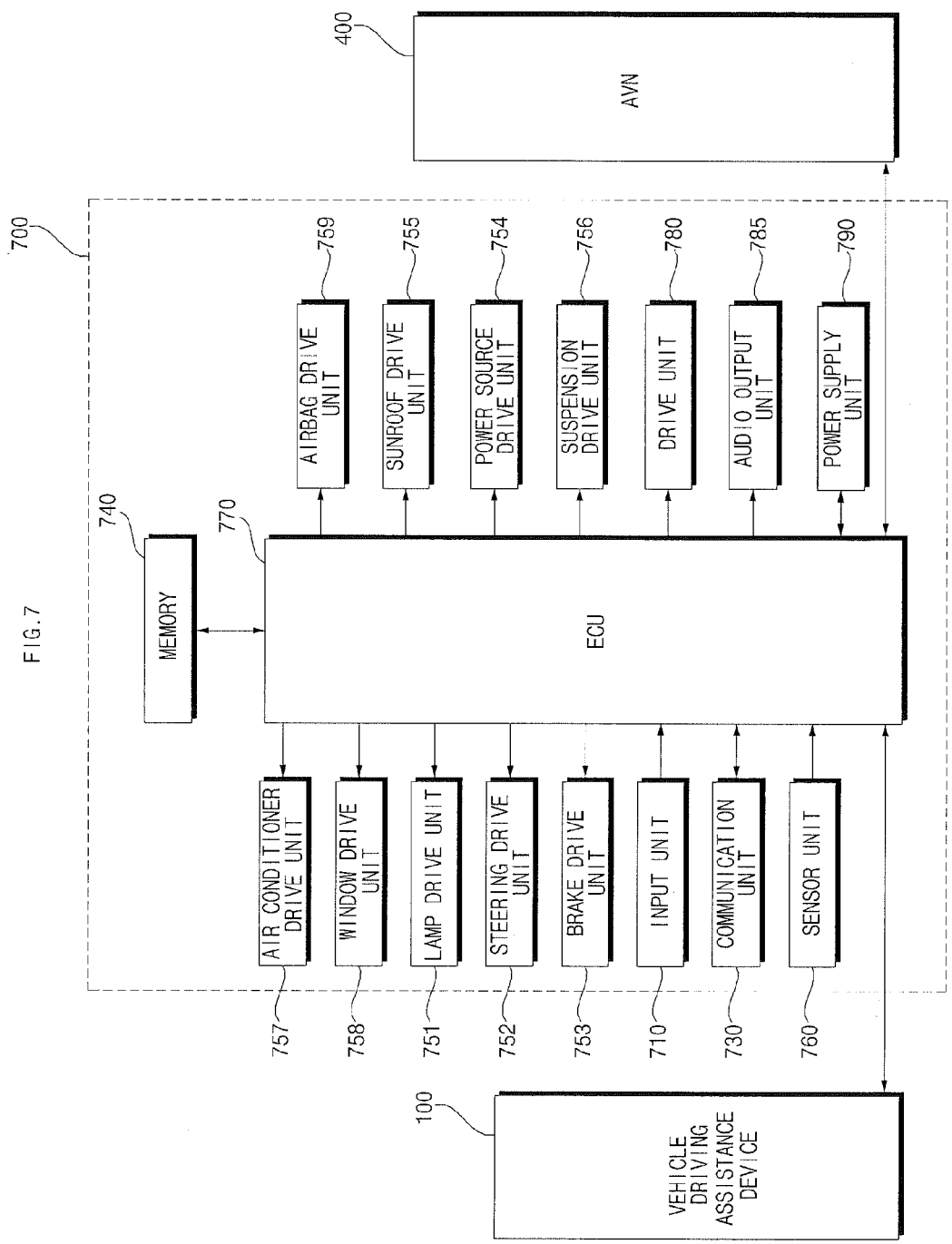
FIG. 7 is a block diagram showing an example of an electronic control apparatus in the vehicle of FIG. 1.

FIG. 7 is a block diagram showing an example of an electronic control apparatus in the vehicle of FIG. 1.

Referring to the figure, the vehicle 200 may include an electronic control apparatus 700 for vehicle control. The electronic control apparatus 700 may exchange data with the vehicle driving assistance device 100 and the AVN apparatus 400.

The electronic control apparatus 700 may include an input unit 710, a communication unit 720, a memory 740, a lamp drive unit 751, a steering drive unit 752, a brake drive unit 753, a power source drive unit 754, a sunroof drive unit, a suspension drive unit 756, an air conditioner drive unit 757, a window drive unit 758, an airbag drive unit 759, a sensor unit 760, an ECU 770, a display unit 780, an audio output unit 785 and a power supply unit 790.

The input unit 710 may include a plurality of buttons or a touchscreen provided inside the vehicle 200. Through the plurality of buttons or the touchscreen, a variety of input operations may be performed.

The communication unit 720 may exchange data with the mobile terminal 600 or the server 500 in a wireless manner. In particular, the communication unit 720 may exchange data with a mobile terminal of a vehicle driver in a wireless manner. A wireless data communication method includes various data communication methods such as Bluetooth, Wi-Fi Direct, Wi-Fi, APiX, etc.

For example, the communication unit 720 may receive weather information and road traffic state information, e.g., Transport Protocol Experts Group (TPEG) information, from the mobile terminal 600 or the server 500.

When a user gets into the vehicle, the mobile terminal 600 of the user and the electronic control apparatus 700 may pair with each other automatically or as the user executes an application.

The memory 740 may store a variety of data for overall operation of the electronic control apparatus 700, such as a program for processing or control of the ECU 770.

The lamp drive unit 751 may turn lamps arranged inside and outside the vehicle on or off. In addition, the lamp drive unit may control, for example, the intensity and direction of light of each lamp. For example, the lamp drive unit may perform control of a turn signal lamp or a brake lamp.

The steering drive unit 752 may perform electronic control of a steering apparatus inside the vehicle 200. The steering drive unit may change the direction of travel of the vehicle.

The brake drive unit 753 may perform electronic control of a brake apparatus (not illustrated) inside the vehicle 200. For example, the brake drive unit may reduce the speed of the vehicle 200 by controlling the operation of brakes located at wheels. In another example, the brake drive unit may adjust the direction of travel of the vehicle 200 leftward or rightward by differentiating the operation of respective brakes located at left and right wheels.

The power source drive unit 754 may perform electronic control of a power source inside the vehicle 200.

For example, in the case where a fossil fuel based engine (not illustrated) is a power source, the power source drive unit 754 may perform electronic control of the engine. Therefore, it is possible to control output torque of the engine.

In another example, in the case where an electric motor (not illustrated) is a power source, the power source drive unit 754 may perform control of the motor. As such, the power source drive unit may control, for example, the RPM and torque of the motor.

The sunroof drive unit 755 may perform electronic control of a sunroof apparatus (not illustrated) inside the vehicle 200. For example, the sunroof drive unit may control opening or closing of a sunroof.

The suspension drive unit 756 may perform electronic control of a suspension apparatus inside the vehicle 200. For example, when a road surface is uneven, the suspension drive unit may control the suspension apparatus to reduce vibration of the vehicle 200.

The air conditioner drive unit 757 may perform electronic control of an air conditioner (not illustrated) inside the vehicle 200. For example, when the interior temperature of the vehicle 200 is high, the air conditioner drive unit may operate the air conditioner to supply cold air to the interior of the vehicle 200.

The window drive unit 758 may perform electronic control of a window apparatus inside the vehicle 200. For example, the window drive unit may control opening or closing of left and right windows of the vehicle 200.

The airbag drive unit 759 may perform the electronic control of an airbag apparatus inside the vehicle 200. For example, the airbag drive unit may control an airbag to be deployed in a dangerous situation.

The sensing unit 760 is configured to sense signals associated with traveling of the vehicle 100. To this end, the sensing unit 760 may include a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, etc.

As such, the sensing unit 760 may acquire sensing signals with regard to, for example, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, etc.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The ECU 770 may control overall operation of the units of the electronic control apparatus 700.

The ECU may perform specific operation based on input received through the input unit 710 or receive and transmit the signal sensed by the sensor unit 760 to the vehicle driving assistance device 100, receive map information from the AVN apparatus 400 and control operations of the drive units 751, 752, 753, 754 and 756.

In addition, the ECU 770 may receive weather information and road traffic state information, e.g., Transport Protocol Experts Group (TPEG) information, from the communication unit 720.

The display unit 780 may display an image related to operation of the vehicle driving assistance device. For image display, the display unit 780 may include a cluster or a head up display (HUD) located at the internal front side of the vehicle. When the display unit 780 is a HUD, a projection module for projecting an image onto the windshield of the vehicle 200 may be included. The display unit 780 may include a touchscreen capable of performing an input function.

The audio output unit 785 converts an electrical signal from the ECU 770 into an audio signal and outputs the audio signal. The audio output unit may include a speaker. The audio output unit 785 may output sound corresponding to operation of the input unit 110, that is, a button.

The power supply unit 790 may supply power required to operate the respective components under the control of the ECU 770. In particular, the power supply unit 790 may receive power from, for example, a battery (not illustrated) inside the vehicle.

As described with reference to FIG. 2, the stereo camera 195 for capturing the image of the front side of the vehicle may be attached to the windshield or ceiling of the vehicle. Hereinafter, the structure of the stereo camera will be described in detail.

Hereinafter, reference numerals different from those of the stereo camera 195 of FIG. 2 may be used.

Figure 8:
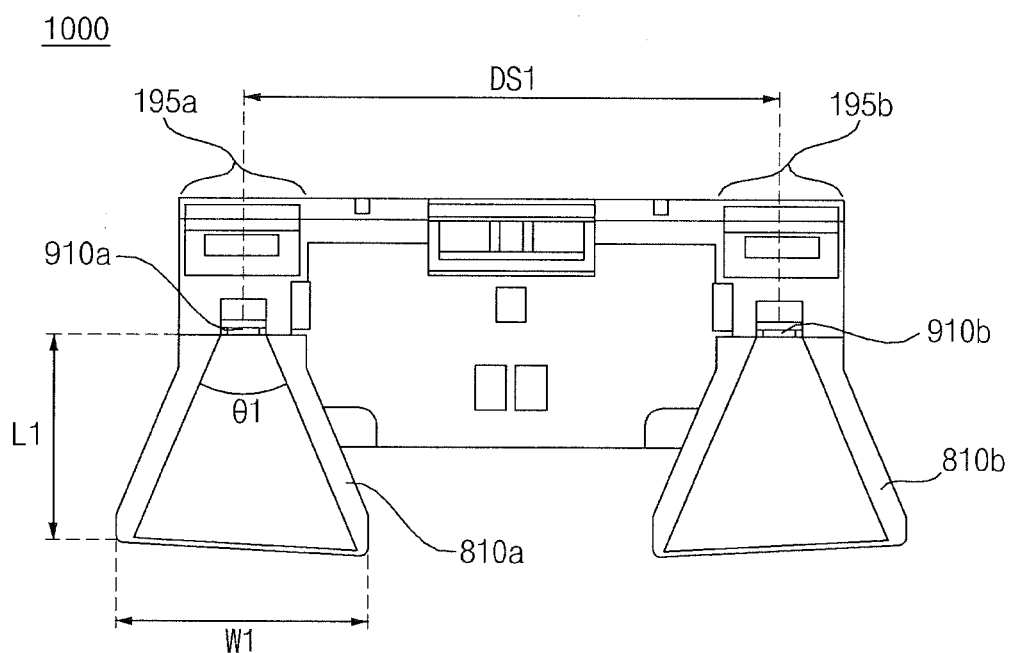
FIG. 8 is a top view of the stereo camera of FIG. 2.
Figure 9:
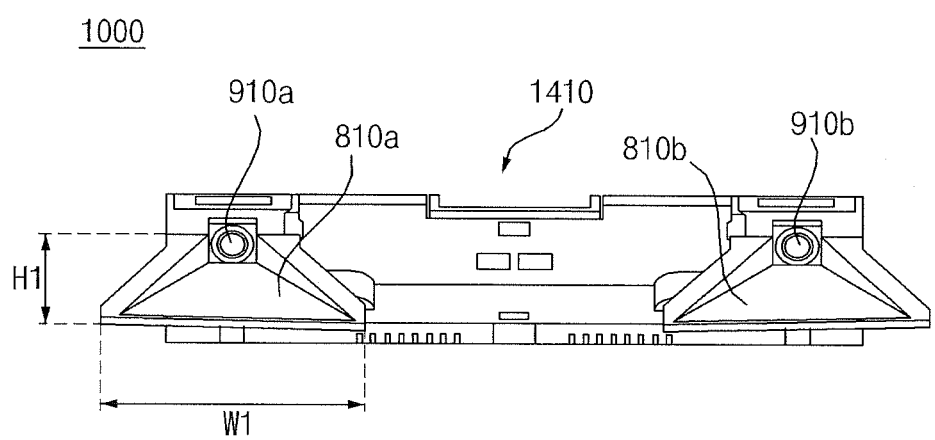
FIG. 9 is a front view of the stereo camera of FIG. 2.

FIG. 8 is a top view of the stereo camera of FIG. 2, and FIG. 9 is a front view of the stereo camera of FIG. 2.

Referring to the figure, a stereo camera 1000, from which a coupler 1010 is removed, and a stereo camera assembly 1410 are shown.

The stereo camera 1000 may include a first camera 195*a* including a first lens 910*a* and a second camera 195*b* including a second lens 910*b*.

The stereo camera 1000 may further include first and second light shield units 810*a* and 810*b* for shielding light incident on first and second lenses 910*a* and 910*b*.

When the stereo camera 1000 is attached to a windshield, the first light shield unit 810*a* and the second light shield unit 810*b* may have sun screens to prevent light incident through the windshield and reflected from the inside of the vehicle and unnecessary external light from being incident on the stereo camera 1000 and, more particularly, the first lens 910*a* and the second lens 910*b*.

In particular, because the stereo camera is attached to the windshield, a lower sun screen may be provided so as to reflect light reflected from the lower side of the windshield.

The shape of the first light shield unit 810*a* and the second light shield unit 810*b* may be changed according to vehicle type.

For example, when the stereo camera 1000 is attached to the windshield of the vehicle, the first light shield unit 810*a* and the second light shield unit 810*b* may be spaced apart from the windshield. At this time, since the curved surface of the windshield may be changed according to vehicle type, the first light shield unit 810*a* and the second light shield unit 810*b* may have a shape which may be changed according to vehicle type.

To this end, the first light shield unit 810*a* and the second light shield unit 810*b* may have a detachable structure. The shape change structure and the detachable structure will be described below with reference to FIG. 13.

Referring to FIGS. 8 to 9, the width W1 and length L1 of the first light shield unit 810a may be set in correspondence with the horizontal angle θ of view of the first camera 195a.

As the horizontal angle θ of view decreases, measurement of a long distance is easy and, as the horizontal angle θ of view increases, measurement of a short distance is easy.

For measurement of a long distance, a distance DS1 between the first lens 910a and the second lens 920a may be greater than twice the width W1 of the first light shield unit 810a. Accordingly, the distance DS1 between the first lens 910a and the second lens 920a may be about 190 mm to 250 mm.

The first camera 195a and the second camera 195b according to the embodiment of the present invention are attached to the vehicle to identify an object located at a long distance therefrom and preferably have a small horizontal angle θ of view.

For example, the horizontal angle θ of view may be set to 90 degrees or less. Accordingly, as shown in the figure, the width W1 of the first light shield unit 810a may be less than the length L1.

A vertical angle of view may be equal or less than the horizontal angle of view. Accordingly, the height H1 of the first light shield unit 810a related to the vertical angle of view may be less than the width W1 or length L1 of the first light shield unit 810a.

The horizontal angle θ of view according to the present embodiment may be about 45 to 70 degrees and the vertical angle of view may be about 25 to 45 degrees.

In the stereo camera 1000 shown in FIGS. 8 to 9, the distance DS1 between the first lens 910a and the second lens 920a may be greater than the length L1 of the first light shield unit 810a, the length L1 of the first light shield unit 810a may be greater than the width W1 of the first light shield unit 810a, and the width W1 of the first light shield unit 810a may be greater than the height H1 of the first light shield unit 810a.

Figure 10:
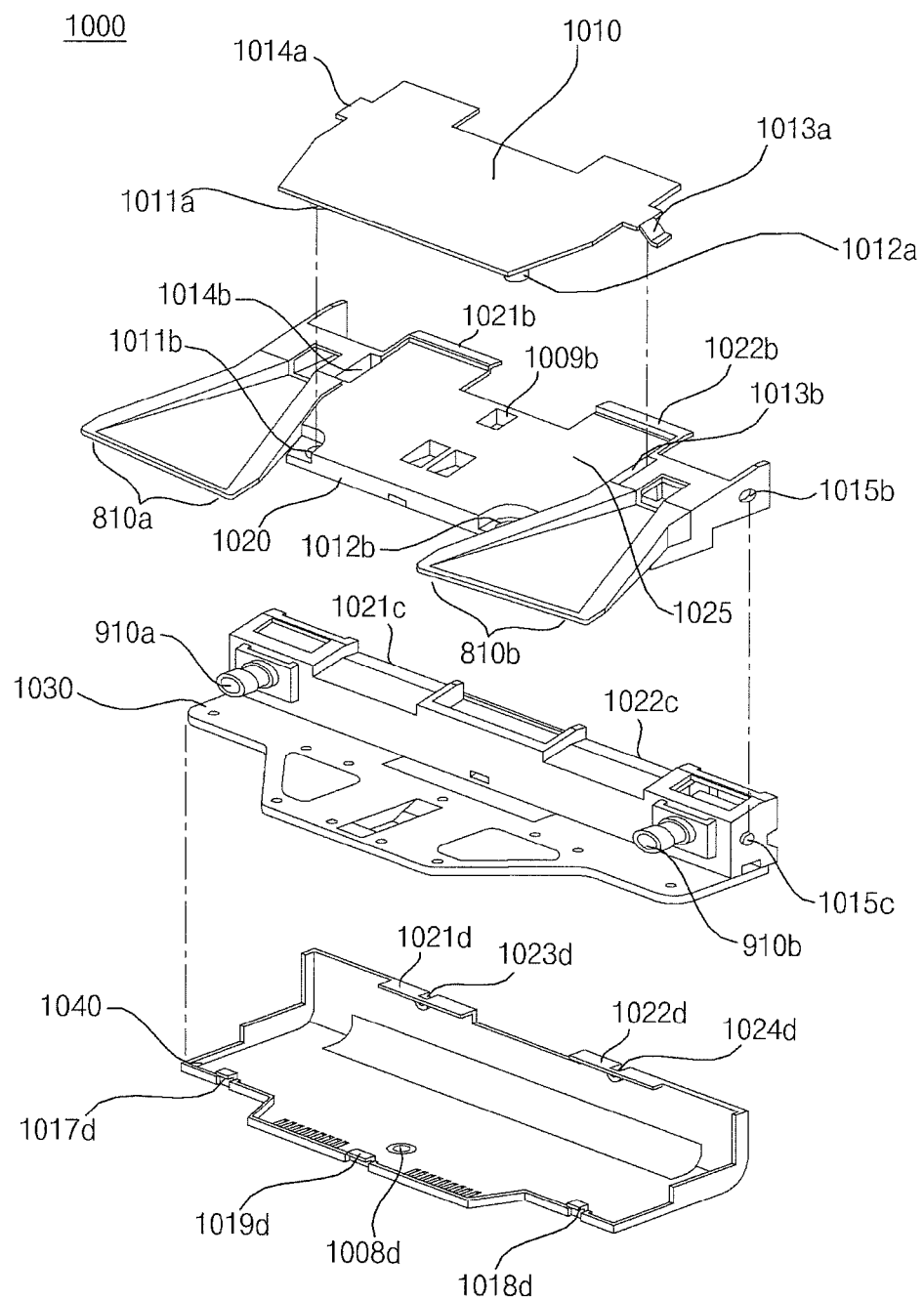
FIG. 10 is an exploded perspective view of a stereo camera according to one embodiment of the present invention.

FIG. 10 is an exploded perspective view of a stereo camera according to one embodiment of the present invention.

Referring to the figure, the stereo camera 1000 includes a front case 1020, a rear case 1040 and a stereo camera module 1030.

That is, in the stereo camera 1000, the stereo camera module 1030 is coupled between the front case 1020 and the rear case 1040.

The front case 1020 may include a first light shield unit 810a and a second light shield unit 810b and the stereo camera module 1030 may include a first lens 910a and a second lens 910b.

The stereo camera 1000 may further include a coupler 1010 attached to the windshield of the vehicle in addition to the front case 1020, the rear case 1040 and the stereo camera module 1030.

In particular, a state of removing the coupler 1010 from the stereo camera 1000 and assembling the front case 1020, the stereo camera module 1030 and the rear case 1040 may be referred to as a stereo camera assembly 1410, which is shown in FIG. 9.

The stereo camera assembly 1410 may be coupled to the coupler 1010 attached to the windshield of the vehicle.

The front case 1020 may include the first light shield unit 810a and the second light shield unit 810b at both sides of a main body 1025 and may include a first coupling groove 1011b coupled to a first protrusion 1011a of the coupler 1010, a second coupling groove 1012b coupled to a second protrusion 1012a of the coupler 1010, a third coupling groove 1013b coupled to a third protrusion 1013a, a fourth coupling groove 1014b coupled to a fourth protrusion 1014a of the coupler 1010 and a fifth coupling groove 1009b coupled to a fifth protrusion (not shown) of the coupler 1010, in the main body 1025 between the first light shield unit 810a and the second light shield unit 810b.

That is, the front case 1020 and the coupler 1010 are attached by coupling the plurality of coupling grooves 1011b, 10112b, 1013b, 1014b and 1009b of the front case 1020 to the plurality of protrusions 1011a, 10112a, 1013a, 1014a, . . . of the coupler 1010.

The stereo camera module 1030 includes a first lens 910a and a second lens 910b and a side protrusion 1015c may be formed on the side of the stereo camera module 1030 in order to attach the stereo camera module 1030 to the front case 1020. The side protrusion 1015c may be coupled to a side coupling groove 1015b formed in the side of the front case 1020.

The stereo camera module 1030 may be seated in the rear case 1040 and the rear case 1040 in which the stereo camera module 1030 is seated may be coupled to the front case 1020.

The rear case 1040 may include a fifth protrusion 1017d, a sixth protrusion 1018d and a seventh protrusion 1019d, for coupling with the front case 1020.

The fifth to seventh protrusions 1017d, 1018d and 1019d may be provided on the front case 1020 and may be coupled to the coupling grooves (not shown) corresponding thereto.

A first clamp 1021d and a second clamp 1022d for coupling with the stereo camera module 1030 and the front case 1020 may be provided at the rear side of the rear case 1040.

In order to attach the stereo camera module 1030 to the front case 1020, first and second engaging parts 1021b and 1022b are formed in parallel on the front case 1020 between the first lens 910a and the second lens 910b. The first and second engaging parts 1021b and 1022b are fixed to first and second holders 1021c and 1022c formed on the stereo camera module 1030 in correspondence thereto.

The first clamp 1021d and the second clamp 1022d surround the first and second engaging parts 1021b and 1022b fixed to the first and second holders 1021c and 1022c and are fixed by screws (not shown) penetrating through the through-holes 1023d and 1024d formed in the first and second clamps 1021d and 1022d.

The rear case 1040 may further include an opening 1008d, into which a rotation rod may be inserted, in order to adjust the vertical angle of the camera, which will be described with reference to FIG. 14D.

Figure 11:
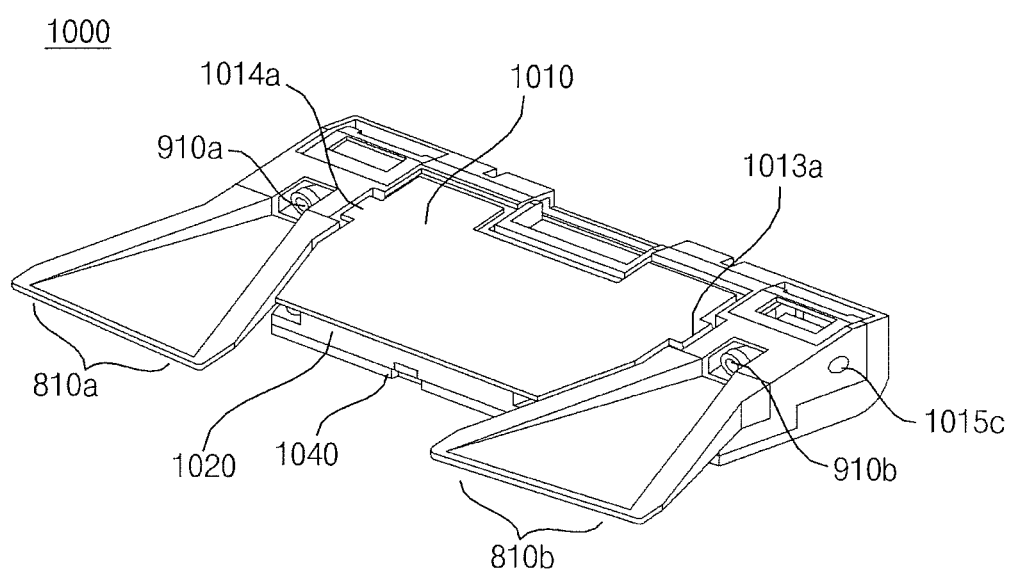
FIG. 11 is a diagram showing a state of assembling the stereo camera of FIG. 10.

FIG. 11 is a diagram showing a state of assembling the stereo camera of FIG. 10.

Referring to the figure, the stereo camera 1000 of FIG. 11 has an appearance obtained by assembling the front case 1020 and the rear case 1040, the stereo camera module 1030 and the coupler 1010, all of which are the components of the stereo camera 1000 of FIG. 10.

In the figure, a first light shield unit 810a is provided at the front side of the first lens 910a and a second light shield unit 810b is provided at the front side of the second lens 910b.

The third protrusion 1013a and fourth protrusion 1014a of the coupler 1010 are coupled to the front case 1020 and the side protrusion 1015c of the stereo camera module 1030 is coupled to the front case 1020.

Figure 12:
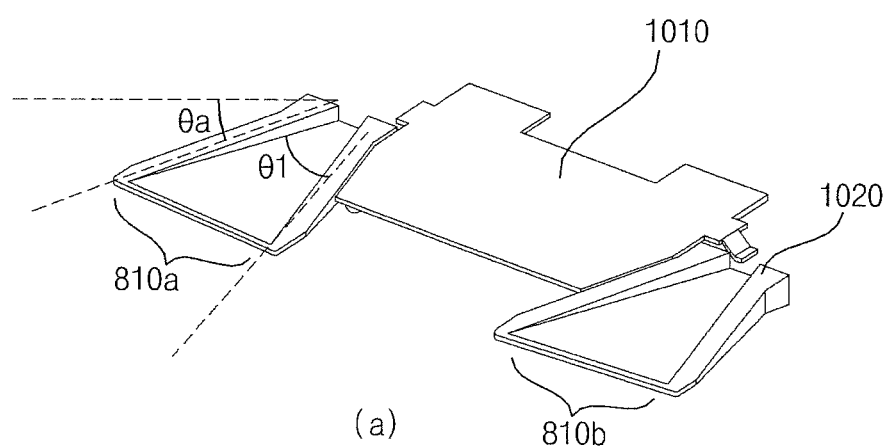
FIG. 12 is a diagram showing various shapes of a light shield unit.
Figure 12:
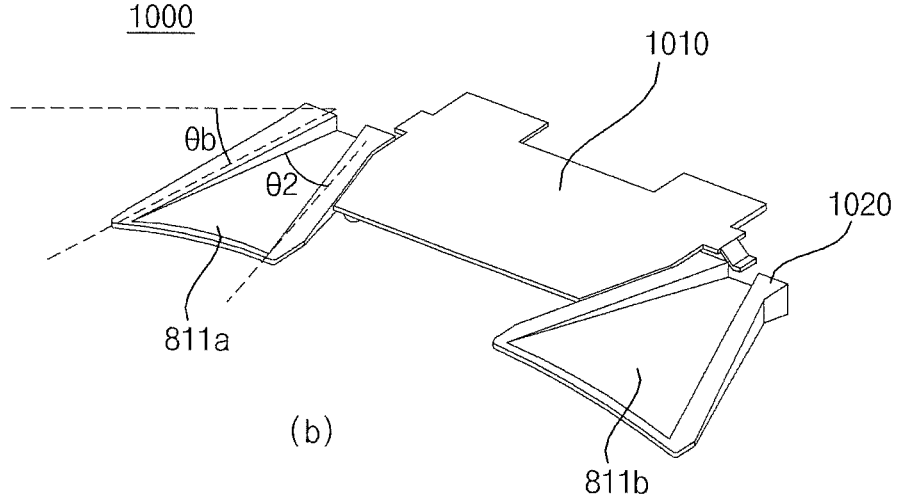

FIG. 12 is a diagram showing various shapes of a light shield unit.

FIG. 12 shows a stereo camera 1000 in which a front case 1020 and a coupler 1010 are coupled. Since the light shield units provided at both sides of the front case 1020 are attached to a windshield with a constant gap therebetween, the light shield units have a shape corresponding to that of the windshield.

First, FIG. 12(a) shows a first light shield unit 810a and a second light shield unit 810b attachable to the windshield when the windshield is inclined with a predetermined gradient. That is, the first light shield unit 810a and the second light shield unit 810b may have a predetermined vertical angle θa to be attachable to an inclined surface having the predetermined gradient.

As described above, the first light shield unit 810a has a predetermined horizontal angle θ of view and, at this time, the horizontal angle θ1 of view may be greater than the vertical angle θa of view.

Next, FIG. 12(b) shows a first light shield unit 811a and a second light shield unit 811b attachable to the windshield when the windshield has a curved surface. That is, the first light shield unit 811a and the second light shield unit 811b may have a curved surface to be attachable to the curved surface of the windshield. At this time, the first light shield unit 811a and the second light shield unit 811b may have a maximum vertical angle θb, which may be greater than the vertical angle θa of FIG. 12(a). Therefore, the first light shield unit 811a and the second light shield unit 811b may be attached to the curved surface of the windshield without a gap.

The horizontal angle θ2 of view may be equal or greater than the maximum vertical angle θb.

Figure 13:
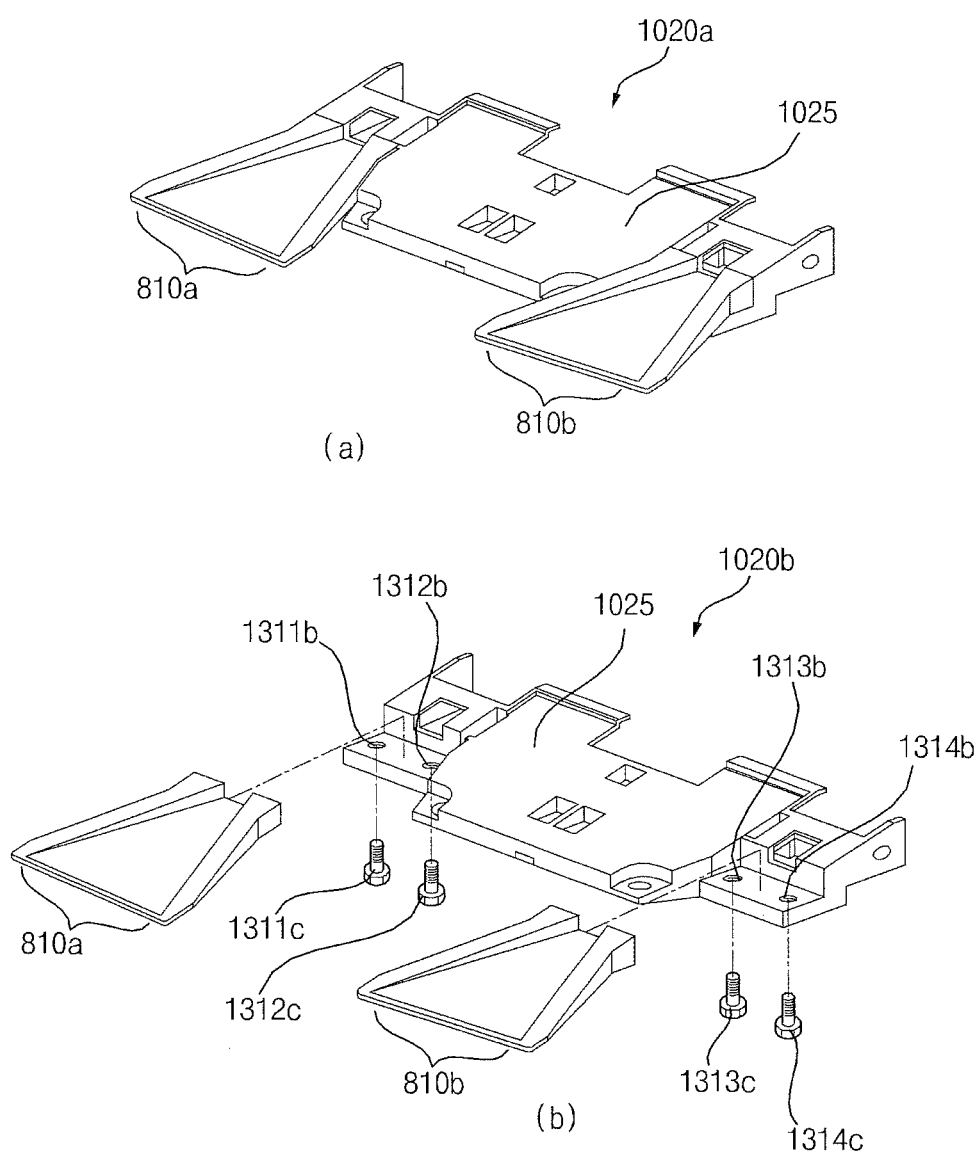
FIG. 13 is a diagram showing a state of attaching and detaching a light shield unit.

FIG. 13 is a diagram showing a state of attaching and detaching a light shield unit.

FIG. 13 shows the first light shield unit 810a and the second light shield unit 810b fixed to the front case 1020 and the first light shield unit 810a and the second light shield unit 810b detached from the front case 1020.

FIG. 13(a) shows a front case 1020a in which the first light shield unit 810a and the second light shield unit 810b are fixed to the main body 1025. Referring to the figure, the first light shield unit 810a and the second light shield unit 810b may be integrally provided in the main body.

FIG. 13(b) shows a front case 1020b in which the first light shield unit 810a and the second light shield unit 810b may be attached to and detached from the main body 1025. Referring to the figure, the first light shield unit 810a and the second light shield unit 810b may be attached by the screws 1311c, 1312c, 1313c and 1314c penetrating through the through-holes 1311b, 1312b, 1313b and 1314b formed in the main body 1025.

When only the light shield units are attached and detached, the light shield units having the shape corresponding to the shape of the windshield may be attached.

FIGS. 14A to 14E are views illustrating a method of mounting a stereo camera in a vehicle.

Figure 14A:
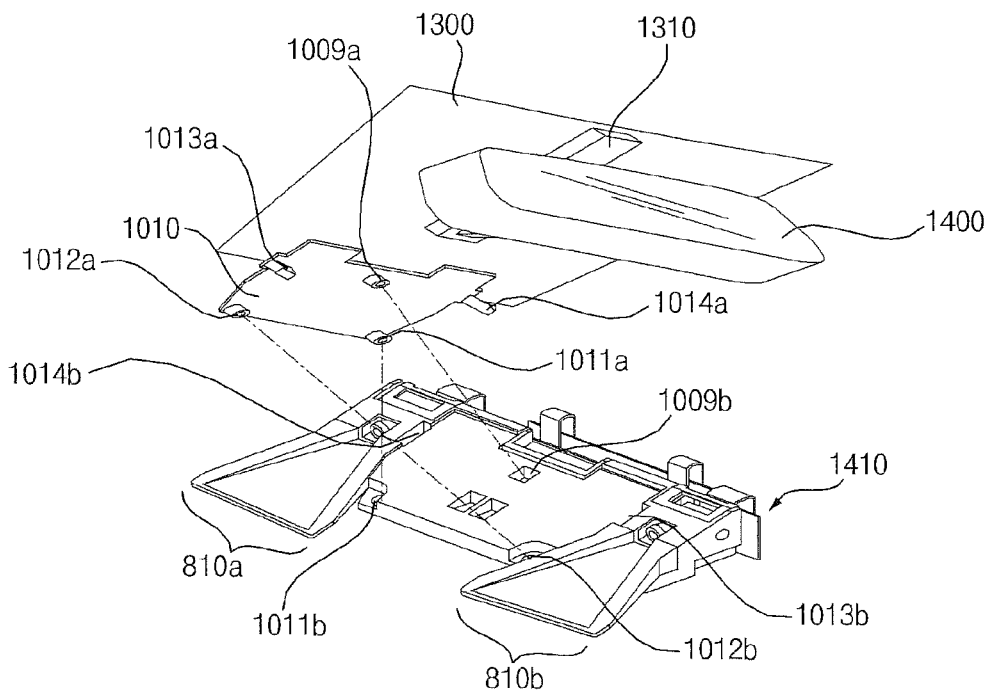
FIGS. 14A to 14E are views illustrating a method of mounting a stereo camera in a vehicle.

First, referring to FIG. 14A, a support member 1310 may be attached to the windshield 1300 of the vehicle and a rear view mirror 1400 may be attached to the support member 1310.

A first surface of the coupler 1010 may be attached to the windshield 1300 of the vehicle. At this time, an adhesive member may be provided between the first surface of the coupler 1010 and the windshield 1300.

In a state of attaching the coupler 1010 to the windshield 1300, a stereo camera assembly 1410 in which the stereo camera module 1030 is coupled between the front case 1020 and the rear case 1040 may be attached.

More specifically, the first to fifth protrusions 1011a, 1012a, 1013a, 1014a and 1009a of the coupler 1010 may be coupled to the first to fifth coupling grooves 1011b, 10112b, 1013b, 1014b and 1009b of the stereo camera assembly 1410. Thus, the stereo camera assembly 1410 is mounted in the coupler 1010.

Figure 14B:
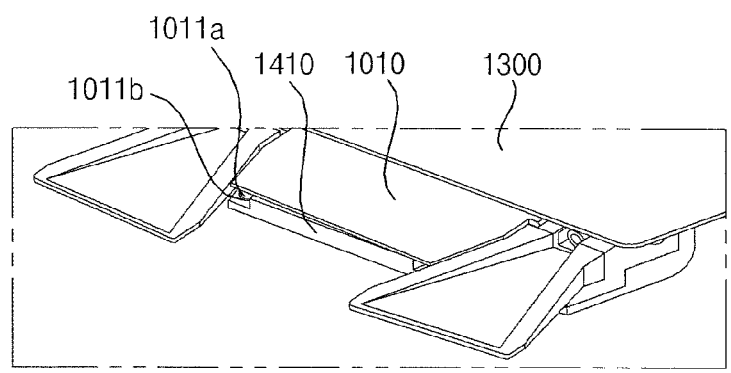
Figure 14C:
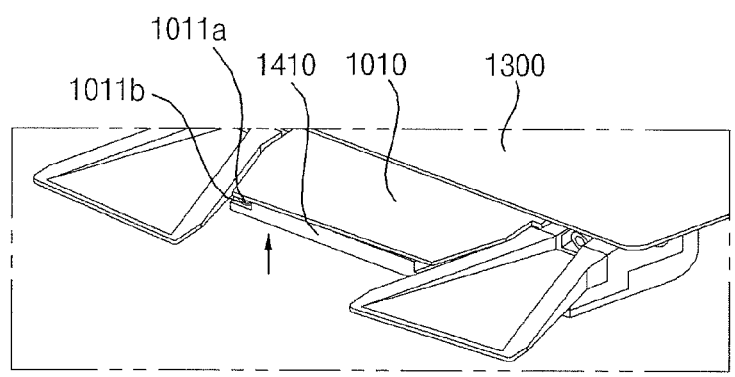

FIGS. 14B to 14C show a method of coupling the stereo camera assembly 1410 and the coupler 1010.

As shown in FIG. 14B, in a state of attaching the first to fifth protrusions 1011a, 1012a, 1013a, 1014a and 1009a of the coupler 1010 to the first to fifth coupling grooves 1011b, 10112b, 1013b, 1014b and 1009b of the stereo camera assembly 1410, when a gap is generated between the protrusion 1011a and the first coupling groove 1011b, as shown in FIG. 14C, the protrusion 1011a and the first coupling groove 1011b are coupled by applying upward force to the stereo camera assembly 1410.

After the stereo camera assembly 1410 and the coupler 1010 are coupled, it is possible to control the positions of the first and second lenses 910a and 910b.

Figure 14D:
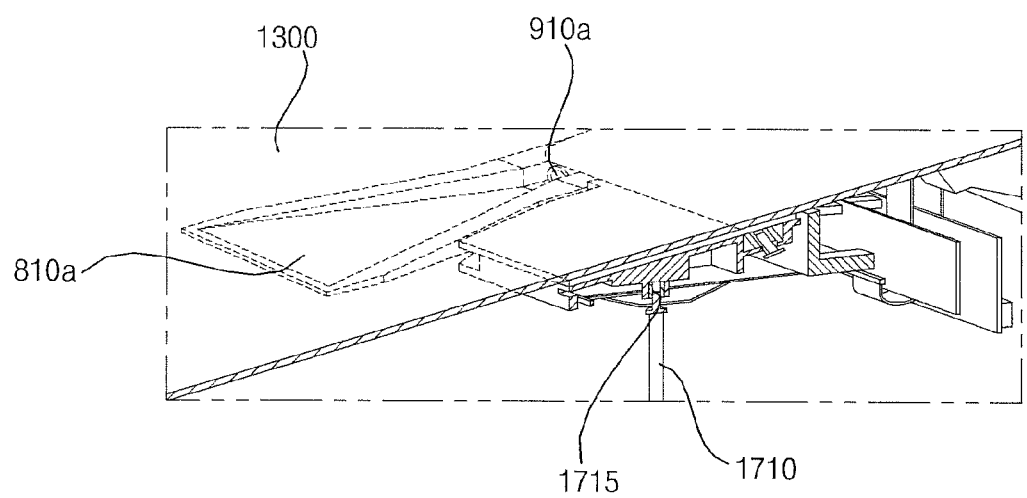
Figure 14E:
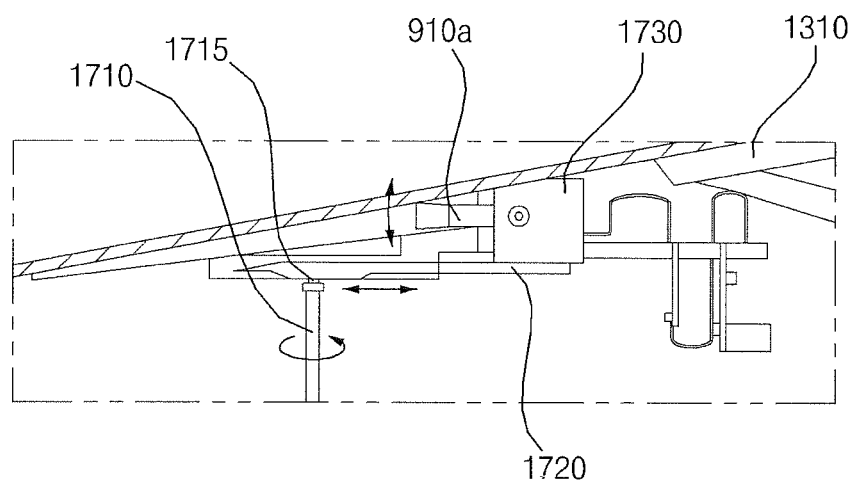

FIG. 14D is a partial perspective view of a stereo camera 1000 when the stereo camera 1000 is attached to a windshield 1300 and FIG. 14E is a side view of the stereo camera.

As described with reference to FIG. 10, the rear case 1040 may include an opening 1008d, into which a rotation rod may be inserted, in order to control the vertical angle of the camera and a rotation member 1715 which may rotate with the rotation rod 1710 inserted into the opening 1008d may be provided in the opening 1008d. At this time, the rotation member 1715 may be a screw.

The rotation member 1715 may be coupled to a straight-line motion member 1720 and the straight-line motion member 1720 may move from side to side in a straight line by rotation of the rotation member 1715.

The straight-line motion member 1720 is connected to a lens case 1730 including a first lens 910 and the side-to-side straight-line motion of the straight-line motion member 1720 is converted into an up-and-down straight-line motion. Thus, the lens case 1730 moves upward and downward and, as a result, the vertical angle of the first lens 910a is changed. Accordingly, it is possible to finely control a photographing direction.

Figure 15:
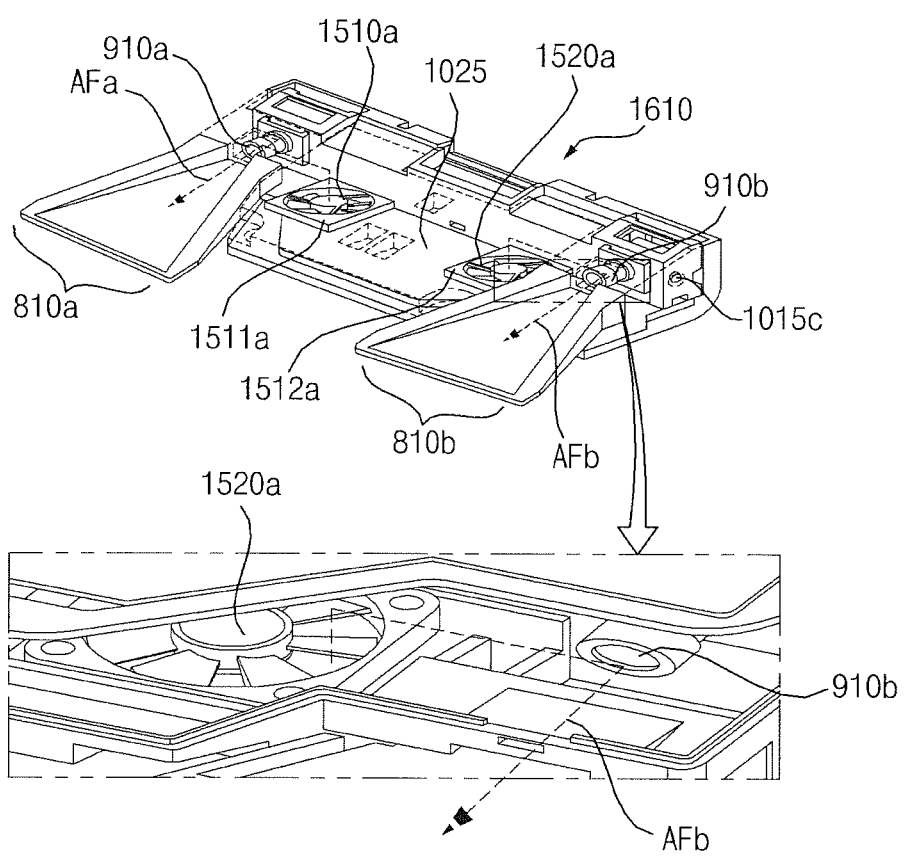
FIG. 15 is a perspective view of a stereo camera according to another embodiment of the present invention.

FIG. 15 is a perspective view of a stereo camera according to another embodiment of the present invention.

Referring to FIG. 15, the stereo camera 1610 of FIG. 15 is similar to the stereo camera 1000 of FIGS. 8 to 14 but is different therefrom in that a first fan 1510a and a second fan 1520a are further included.

The first fan 1510a and the second fan 1520a may be provided to defrost or demist the windshield 1300 of the vehicle according to humidity condition.

To this end, the fans may be formed adjacent to the first lens 910a and the second lens 910b, and, more particularly, by the side of the first lens 910 and the second lens 910b, such that a flow channel is formed to the windshield through the first light shield unit 810a and the second light shield unit 810b.

In the main body 1025 of the front case 1020, a first seat part 1511a and a second seat part 1521a for the first fan 1510a and the second fan 1520a are provided in the main body 1025 of the front case 1020 and the first fan 1510a and the second fan 1520a may be respectively seated in the first fan 1510a and the second fan 1520a.

In particular, openings may be formed in the first seat part 1511a and the second seat part 1521a in a vertical direction and the first fan 1510*a* and the second fan 1520*a* may be seated. Warm air generated in a circuit member (not shown) provided below the first fan 1510*a* and the second fan 1520*a* passes through the first fan 1510*a* and the second fan 1520*a* such that warm airs AFa and AFb are moved toward the first lens 910*a* and the second lens 910*b* and, as a result, are moved to toward the windshield through the first light shield unit 810*a* and the second light shield unit 810*b*.

Accordingly, it is possible to rapidly defrost or demist the windshield 1300 of the vehicle.

Figure 16:
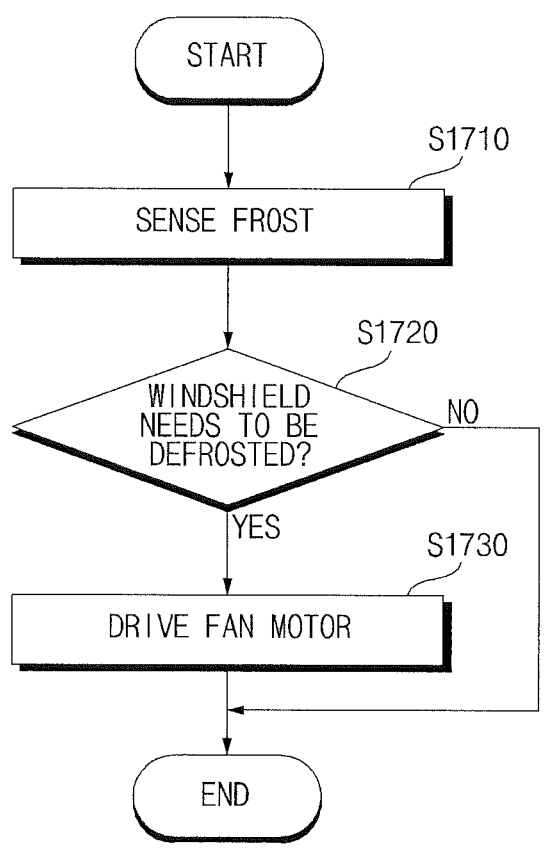
FIG. 16 is a flowchart illustrating a method of operating the stereo camera of FIG. 15.

FIG. 16 is a flowchart illustrating a method of operating the stereo camera of FIG. 15.

Referring to the figure, the processor 170 of the vehicle driving assistance device 100 may sense frost in the vehicle (S1710). The processor 170 of the vehicle driving assistance device 100 may determine whether the windshield needs to be defrosted based on a received temperature/humidity signal (S 1720). If the windshield needs to be defrosted, a fan motor may be driven (S1730).

As an example of a frost sensing method, the interior temperature or humidity of the vehicle may be used. That is, the sensor unit 760 of the vehicle may sense the interior temperature or humidity of the vehicle through the temperature sensor or humidity sensor of the vehicle.

The temperature/humidity signal sensed by the sensor unit 760 of the vehicle may be input to the processor 170 of the vehicle driving assistance device 100 through the interface 130. The processor 170 of the vehicle driving assistance device 100 may determine whether the windshield is frosted based on the interior temperature/humidity signal of the vehicle. In addition, when the windshield is frosted, whether the windshield needs to be defrosted may be determined. When the windshield is slightly frosted, the windshield need not be defrosted. However, when the windshield is significantly frosted, the windshield needs to be defrosted. When the windshield needs to be defrosted, the processor 170 of the vehicle driving assistance device 100 may operate the fan motor (not shown) provided in the stereo camera 1610 to operate the first fan 1510*a* and the second fan 1520*a*.

As another example of the frost sensing method, stereo images captured by the stereo camera 1610 may be used. The processor 170 of the vehicle driving assistance device 100 may receive the stereo images captured by the stereo cameras 1610 and determine whether the windshield needs to be defrosted or demisted through image quality analysis of the received stereo images.

For example, blurring occurs over the image input to the processor 170 of the vehicle driving assistance device 100 and, as blurring becomes severe, it is determined that the windshield of the vehicle gradually becomes frosted. In particular, when blurring exceeds a threshold, the processor 170 of the vehicle driving assistance device 100 may determine that the windshield needs to be defrosted and operate the fan motor (not shown) to operate the first fan 1510*a* and the second fan 1520*a*.

Accordingly, it is possible to conveniently defrost the windshield of the vehicle.

Unlike FIG. 16, the first fan 1510*a* and the second fan 1520*a* may continuously operate upon driving the vehicle, that is, may operate after starting up the vehicle and stop after turning off the vehicle.

Figure 17:
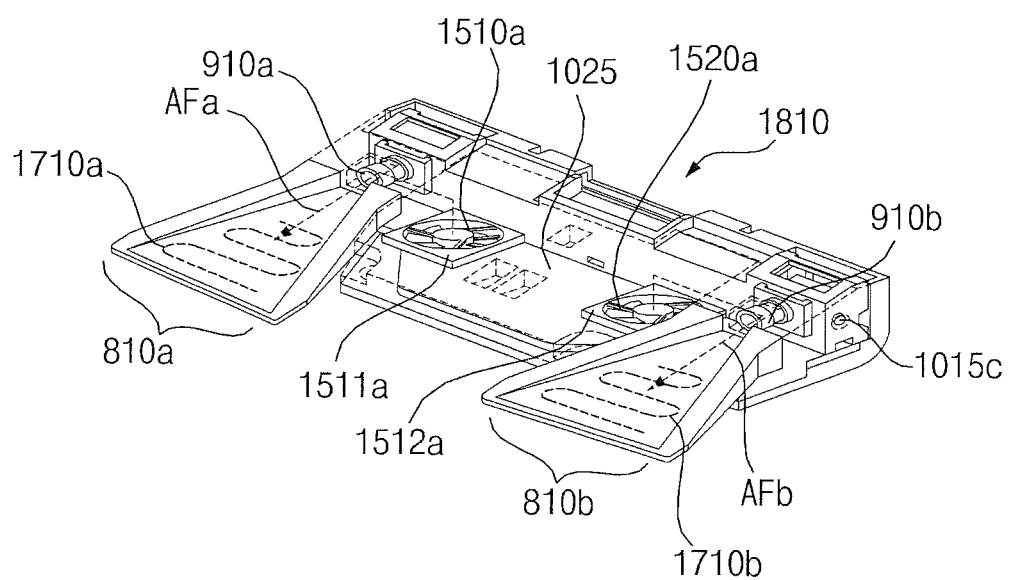
FIG. 17 is a perspective view of a stereo camera according to another embodiment of the present invention.

FIG. 17 is a perspective view of a stereo camera according to another embodiment of the present invention.

Referring to FIG. 17, the stereo camera 1810 of FIG. 17 is similar to the stereo camera 1610 of FIG. 15 but is different therefrom in that a first hot wire 1710 and a second hot wire 1710*b* are respectively provided in the first light shield unit 810*a* and the second light shield unit 810*b*.

By the first hot wire 1710*a* and the second hot wire 1710*b*, heat may be applied to warm airs AFa and AFb passing through the first light shield unit 810*a* and the second light shield unit 810*b* to rapidly defrost or demist the windshield of the vehicle.

Only the first hot wire 1710*a* and the second hot wire 1710*b* may be provided without the first fan 1510*a* and the second fan 1520*a* of FIG. 17.

As is apparent from the above description, the stereo camera according to the embodiments of the present invention includes a first light shield unit and a second light shield unit respectively provided at front sides of a first lens and a second lens and a first fan and a second fan respectively provided at the sides of the first lens and the second lens to operate in order to defrost a windshield of a vehicle. Thus, it is possible to rapidly defrost or demist the windshield of the vehicle.

A front case in which the first light shield unit and the second light shield unit are provided at both sides of a main body is included, and the first light shield unit and the second light shield unit are able to be attached to or detached from the front case. Accordingly, the light shield units having a shape corresponding to that of the windshield may be selected and attached.

A width of the first light shield unit is less than a length of the first light shield unit, the width of the first light shield unit is greater than a height of the first light shield unit, and a distance between the first lens and the second lens is greater than the width of the first light shield unit. Accordingly, measurement of a long distance is easy.

First and second hot wires may be provided in the first light shield unit and the second light shield unit, respectively. Accordingly, it is possible to rapidly defrost or demist the windshield of the vehicle.

By the first light shield unit and the second light shield unit, it is possible to prevent light incident through the windshield and reflected from the inside of the vehicle and unnecessary external light from being incident on the lenses.

A rotation rod may be inserted into an opening formed in a rear case and rotated to control the vertical angle of the camera. Accordingly, it is possible to finely control a photographing direction.

Upon detecting an object based on stereo images, disparity may be calculated using the stereo images and the object may be detected based on the disparity information. Accordingly, it is possible to reduce a data processing rate.

The stereo camera and the vehicle including the same according to the foregoing embodiments are not restricted to the configuration and method of the embodiments set forth herein. Therefore, some or all of the above-described embodiments may be selectively combined to make various modifications.

The vehicle driving assistance device or the method of operating the vehicle according to the present invention may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, optical data storage, and a carrier wave (e.g., data transmission over the Internet). The computer-readable recording medium may be distributed over a plurality of computer systems connected to a network so that computer-readable code is written thereto and executed therefrom in a decentralized manner. Functional programs, code, and code segments to realize the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A stereo camera comprising:
a first lens and a second lens;
a first light shield unit and a second light shield unit respectively provided at front sides of the first lens and the second lens and configured to shield light incident on the first lens and the second lens;
a first fan and a second fan respectively provided at the sides of the first lens and the second lens and configured to defrost a windshield of a vehicle; and
a front case in which the first light shield unit and the second light shield unit are provided at both sides of a main body,
wherein the first light shield unit and the second light shield unit are configured to be attached to or detached from the front case,
wherein a width of the first light shield unit is less than a length of the first light shield unit, and the width of the first light shield unit is greater than a height of the first light shield unit, and
wherein a distance between the first lens and the second lens is greater than the width of the first light shield unit,
wherein when the stereo camera is attached to the windshield of the vehicle, the first light shield unit and the second light shield unit are spaced apart from the windshield,
wherein the first light shield unit and the second light shield unit have a curved surface to be attachable to a curved surface of the windshield,
wherein a distance between the windshield of the vehicle and the first light shield unit and a distance between the windshield of the vehicle and the second light shield unit are constant.

2. The stereo camera according to claim 1, further comprising a first hot wire and a second hot wire respectively provided in the first light shield unit and the second light shield unit.

3. The stereo camera according to claim 1, further comprising a stereo camera module comprising the first lens and the second lens and comprising a side protrusion configured to couple with the front case.

4. The stereo camera according to claim 3, further comprising:
a coupler attached to the windshield of the vehicle and comprising a plurality of protrusions configured to couple with the front case; and
a rear case coupled to the front case and the stereo camera module and comprising a plurality of protrusions configured to couple with the front case.

5. The stereo camera according to claim 4, wherein the rear case comprises openings, into which rotation rods are insertable, that are configured to control vertical angles of the first lens and the second lens.

6. A stereo camera comprising:
a front case in which a first light shield unit and a second light shield unit are provided at both sides of a main body;
a stereo camera module comprising a first lens and a second lens and a side protrusion configured to couple with the front case; and
a rear case coupled to the front case and the stereo camera module and comprising a plurality of protrusions configured to couple with the front case,
wherein the first light shield unit and the second light shield unit are configured to be attached to or detached from the front case,
wherein a width of the first light shield unit is less than a length of the first light shield unit, and the width of the first light shield unit is greater than a height of the first light shield unit, and
wherein a distance between the first lens and the second lens is greater than the width of the first light shield unit,
wherein when the stereo camera is attached to a windshield of a vehicle, the first light shield unit and the second light shield unit are spaced apart from the windshield,
wherein the first light shield unit and the second light shield unit have a curved surface to be attachable to a curved surface of the windshield,
wherein a distance between the windshield of the vehicle and the first light shield unit and a distance between the windshield of the vehicle and the second light shield unit are constant.

7. A vehicle comprising:
a sensor unit;
a steering drive unit for driving a steering apparatus;
a brake drive unit for driving a brake apparatus;
a power source drive unit for driving a power source;
a suspension drive unit for driving a suspension apparatus;
a controller configured to control the steering drive unit, the brake drive unit, the power source drive unit, and the suspension drive unit; and
a vehicle driving assistance device comprising a stereo camera that comprises:
a first lens and a second lens,
a first light shield unit and a second light shield unit respectively provided at front sides of the first lens and the second lens and configured to shield light incident on the first lens and the second lens,
a first fan and a second fan respectively provided at the sides of the first lens and the second lens and configured to defrost a windshield of the vehicle, and
a front case in which the first light shield unit and the second light shield unit are provided at both sides of a main body,
wherein the first light shield unit and the second light shield unit are configured to be attached to or detached from the front case,
wherein a width of the first light shield unit is less than a length of the first light shield unit and the width of the first light shield unit is greater than a height of the first light shield unit, and
wherein a distance between the first lens and the second lens is greater than the width of the first light shield unit, wherein when the stereo camera is attached to the windshield of the vehicle, the first light shield unit and the second light shield unit are spaced apart from the windshield, wherein the first light shield unit and the second light shield unit have a curved surface to be attachable to a curved surface of the windshield, wherein a distance between the windshield of the vehicle and the first light shield unit and a distance between the windshield of the vehicle and the second light shield unit are constant.

8. The vehicle according to claim 7, wherein the vehicle driving assistance device further comprises a processor configured to detect, based on stereo images received from the stereo camera, a distance from a peripheral vehicle, a speed difference with the peripheral vehicle, and a lane.

9. The vehicle according to claim 8, wherein the processor is further configured to:
sense frost on the windshield of the vehicle based on a sensor signal from the sensor unit or the stereo images from the stereo camera; and
control operations of the first fan and the second fan based on the sensed frost.

10. The vehicle according to claim 8, wherein the processor comprises:
a disparity calculator to calculate disparity of the stereo images;
an object detector to detect an object from at least one of the stereo images based on disparity information of the stereo images; and
an object tracking unit to track the detected object.

11. The vehicle according to claim 10, wherein:
the processor further comprises:
a segmentation unit to segment an object in the stereo images based on disparity information of the stereo images; and
an object verification unit to classify the detected object, and
the object detector is configured to detect an object from at least one of the stereo images based on the segmented object.

12. The vehicle according to claim 7, wherein the stereo camera further comprises a first hot wire and a second hot wire respectively provided in the first light shield unit and the second light shield unit.

13. The vehicle according to claim 7, wherein the stereo camera further comprises a stereo camera module that comprises:
the first lens and the second lens; and
a side protrusion configured to couple with the front case.

14. The vehicle according to claim 13, further comprising:
a coupler attached to the windshield of the vehicle and comprising a plurality of protrusions configured to couple with the front case; and
a rear case coupled to the front case and the stereo camera module and comprising a plurality of protrusions configured to couple with the front case.

* * * * *